US011906020B2

(12) United States Patent
Raymond et al.

(10) Patent No.: US 11,906,020 B2
(45) Date of Patent: Feb. 20, 2024

(54) SYSTEMS AND METHODS THAT USE HARMONIC DRIVES FOR CONVERTING RECIPROCATING AXIAL MOTION TO CONTINUOUS ROTARY MOTION, HELICAL DRIVES FOR CONVERTING RECIPROCATING ROTARY MOTION TO RECIPROCATING AXIAL MOTION AND COMBINATIONS THEREOF FOR CONVERTING RECIPROCATING ROTARY MOTION TO CONTINUOUS ROTARY MOTION

(71) Applicants: National Technology & Engineering Solutions of Sandia, LLC, Albuquerque, NM (US); William T. Radigan, Albuquerque, NM (US)

(72) Inventors: David W. Raymond, Edgewood, NM (US); William T. Radigan, Albuquerque, NM (US)

(73) Assignees: National Technology & Engineering Solutions of Sandia, LLC, Albuquerque, NM (US); William T. Radigan, Albuquerque, NM (US)

( * ) Notice: Subject to any disclaimer, the term of this patent is extended or adjusted under 35 U.S.C. 154(b) by 53 days.

(21) Appl. No.: 17/474,721

(22) Filed: Sep. 14, 2021

(65) Prior Publication Data

US 2021/0404542 A1    Dec. 30, 2021

Related U.S. Application Data

(62) Division of application No. 16/177,312, filed on Oct. 31, 2018, now Pat. No. 11,143,275.

(Continued)

(51) Int. Cl.
*E21B 4/02* (2006.01)
*F16H 25/12* (2006.01)
(Continued)

(52) U.S. Cl.
CPC ............ *F16H 25/122* (2013.01); *E21B 4/006* (2013.01); *E21B 4/02* (2013.01); *F16H 25/06* (2013.01);
(Continued)

(58) Field of Classification Search
CPC ........ F16H 25/122; F16H 25/06; F15B 15/02; F15B 15/068; F15B 15/08;
(Continued)

(56) References Cited

U.S. PATENT DOCUMENTS 4,731,886 A   3/1988   Heinrich et al.
5,485,760 A   1/1996   Lange
(Continued)

FOREIGN PATENT DOCUMENTS

GB      890440       2/1962
GB      890440 A  *  2/1962
(Continued)

*Primary Examiner* — Randell J Krug
(74) *Attorney, Agent, or Firm* — Daniel J. Jenkins

(57) ABSTRACT

A harmonic drive assembly and fluid-powered linear motors with both axial pistons are rotary piston arrangements incorporating the harmonic drive assembly are disclosed. The motors may be used in downhole drilling applications, but the drive assembly and/or motors may be used in other applications. The assembly, motors and methods use advanced harmonic drives, advanced helical drives, and combinations thereof with 1) motors with axial pistons and reciprocating linear rings to convert reciprocative axial motion to continuous rotary motion, and 2) motors with rotary pistons and reciprocating linear rings to rectify reciprocative rotary motion to continual rotary motion to improve (Continued)

performance over prior configurations. Axial pistons provide a robust simple solution for generating rotation; Rotational pistons provide increased torque generation as the torque generated is proportional to motor length. Since downhole drills are long, a high-torque motor can be produced using this method.

26 Claims, 33 Drawing Sheets

Related U.S. Application Data

(60) Provisional application No. 62/579,265, filed on Oct. 31, 2017.

(51) Int. Cl.
*E21B 4/00* (2006.01)
*F16H 25/06* (2006.01)
*F16H 49/00* (2006.01)

(52) U.S. Cl.
CPC ..... *F16H 49/001* (2013.01); *F16H 2025/063* (2013.01)

(58) Field of Classification Search
CPC ............ F15B 2015/1495; F15B 15/063; F01B 11/04; E21B 4/02; E21B 4/006
See application file for complete search history.

(56) References Cited

U.S. PATENT DOCUMENTS

| | | | |
|---|---|---|---|
| 6,047,778 | A | 4/2000 | Coffman et al. |
| 2005/0067798 | A1* | 3/2005 | Uchiyama ......... B60G 21/0555 280/5.511 |
| 2010/0067997 | A1 | 3/2010 | Yagishita |

FOREIGN PATENT DOCUMENTS

| | | | |
|---|---|---|---|
| GB | 1035128 | | 7/1966 |
| GB | 1035128 A | * | 7/1966 |

* cited by examiner

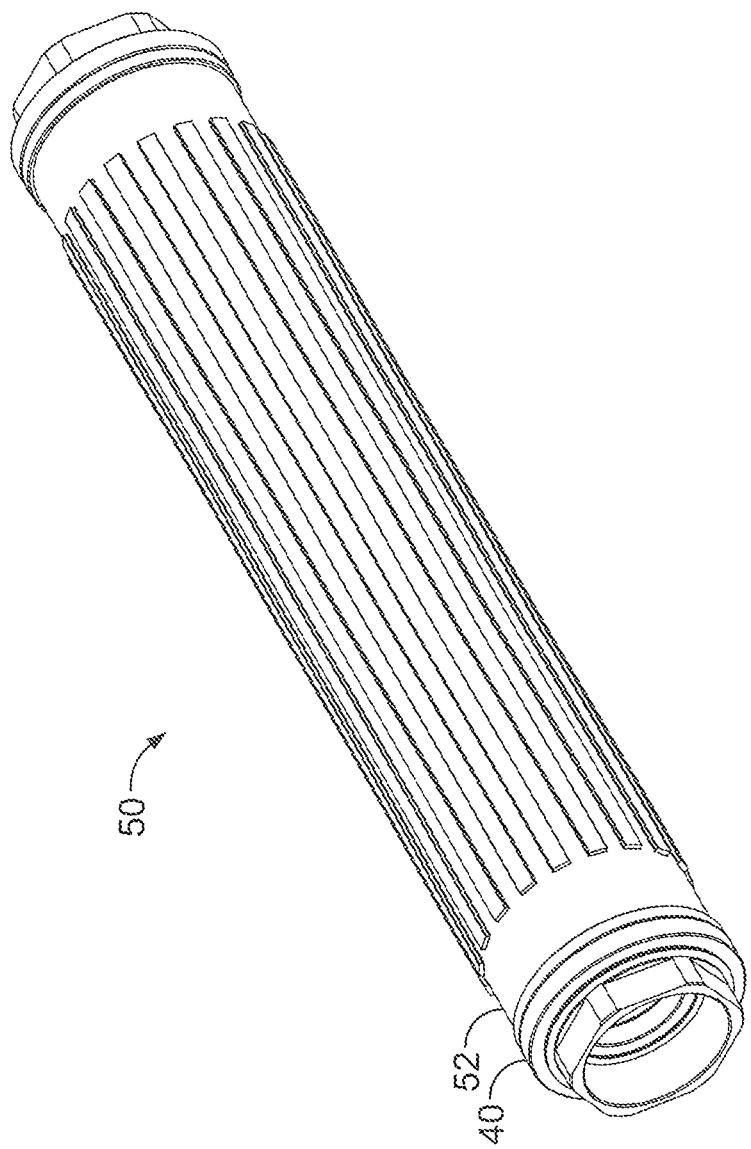

| Harmonics | 1 | 2 | 3 | 4 | 5 | 6 | 7 | 8 | 9 | 10 | ... |
|---|---|---|---|---|---|---|---|---|---|---|---|
| 1 | | 1:2 | 1:3 | 1:4 | 1:5 | 1:6 | 1:7 | 1:8 | 1:9 | 1:10 | ... |
| 2 | | | 2:3 | 2:4 | 2:5 | 2:6 | 2:7 | 2:8 | 2:9 | 2:10 | ... |
| 3 | | | | 3:4 | 3:5 | 3:6 | 3:7 | 3:8 | 3:9 | 3:10 | ... |
| 4 | | | | | 4:5 | 4:6 | 4:7 | 4:8 | 4:9 | 4:10 | ... |
| 5 | | | | | | 5:6 | 5:7 | 5:8 | 5:9 | 5:10 | ... |
| 6 | | | | | | | 6:7 | 6:8 | 6:9 | 6:10 | ... |
| 7 | | | | | | | | 7:8 | 7:9 | 7:10 | ... |
| 8 | | | | | | | | | 8:9 | 8:10 | ... |
| 9 | | | | | | | | | | | ... |
| ... | | | | | | | | | | | ... |

Rows: Rotor - A. Columns: Stator - B.

Figure 5

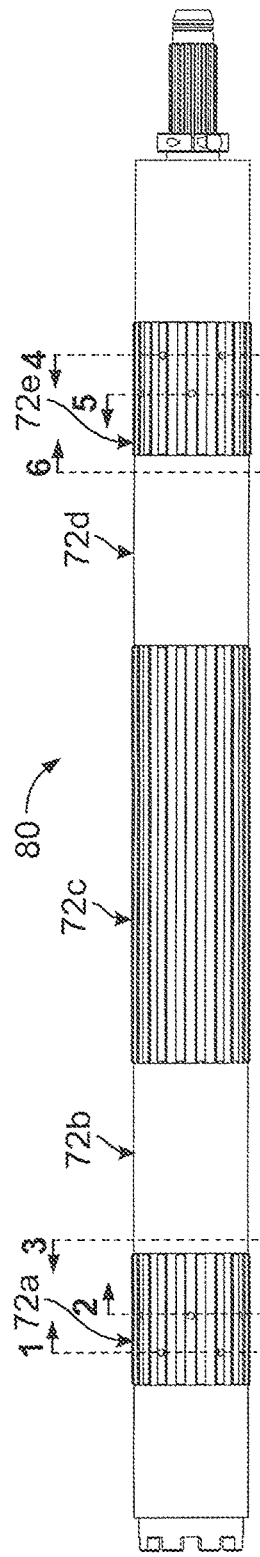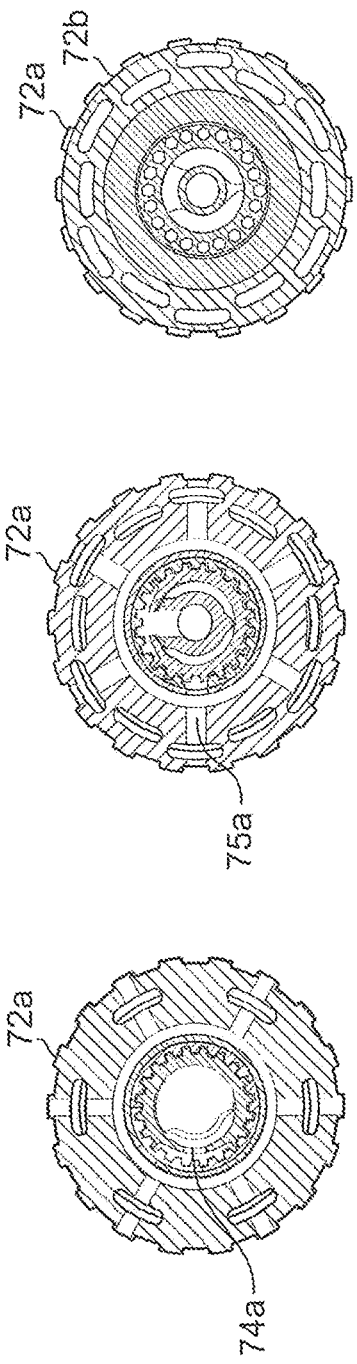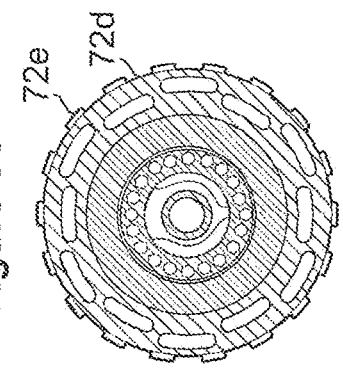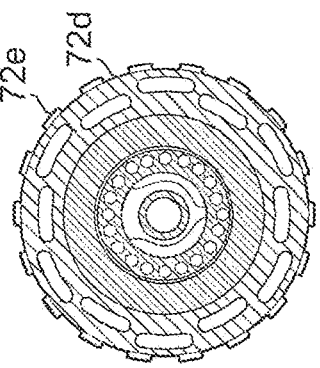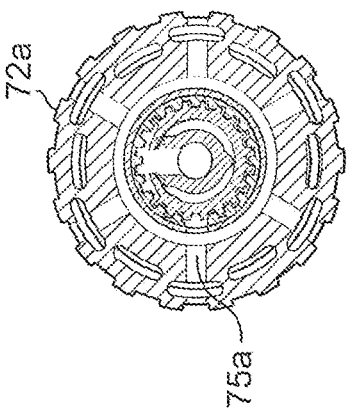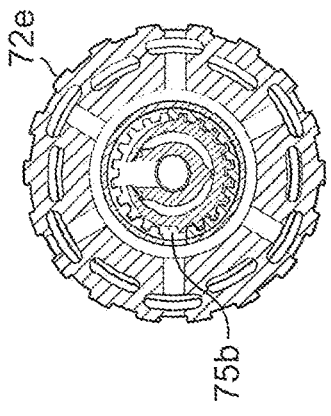

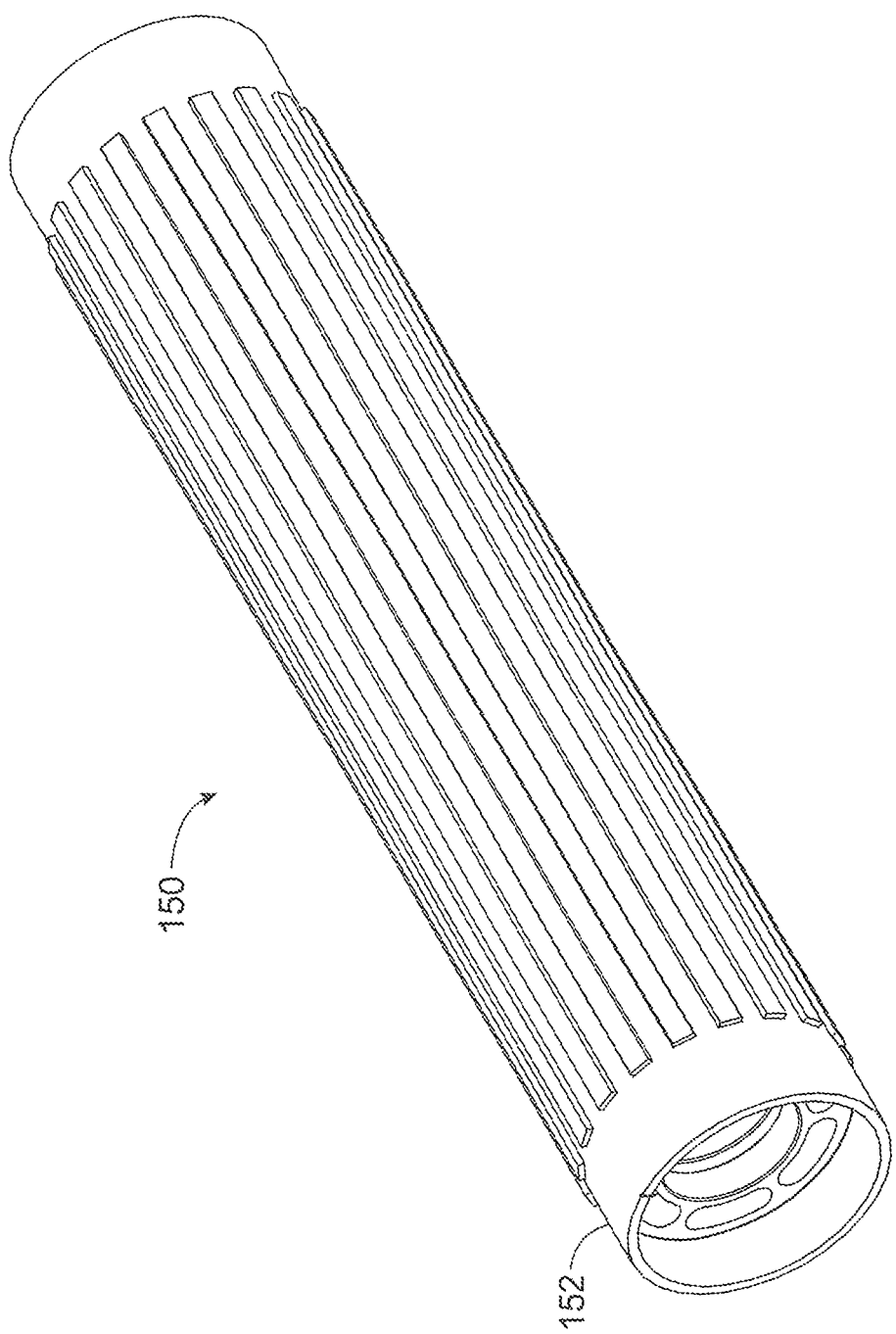

SYSTEMS AND METHODS THAT USE HARMONIC DRIVES FOR CONVERTING RECIPROCATING AXIAL MOTION TO CONTINUOUS ROTARY MOTION, HELICAL DRIVES FOR CONVERTING RECIPROCATING ROTARY MOTION TO RECIPROCATING AXIAL MOTION AND COMBINATIONS THEREOF FOR CONVERTING RECIPROCATING ROTARY MOTION TO CONTINUOUS ROTARY MOTION

CROSS-REFERENCE TO RELATED APPLICATIONS

This application is a divisional of U.S. Ser. No. 16/177,312, entitled "SYSTEMS AND METHODS THAT USE HARMONIC DRIVES FOR CONVERTING RECIPROCATING AXIAL MOTION TO CONTINUOUS ROTARY MOTION, HELICAL DRIVES FOR CONVERTING RECIPROCATING ROTARY MOTION TO RECIPROCATING AXIAL MOTION AND COMBINATIONS THEREOF FOR CONVERTING RECIPROCATING ROTARY," by Raymond et al., filed Oct. 31, 2018, which claims priority to provisional patent application U.S. Ser. No. 62/579,265, entitled "SYSTEMS AND METHODS THAT USE HARMONIC DRIVES FOR CONVERTING RECIPROCATING AXIAL MOTION TO CONTINUOUS ROTARY MOTION, HELICAL DRIVES FOR CONVERTING RECIPROCATING ROTARY MOTION TO RECIPROCATING AXIAL MOTION AND COMBINATIONS THEREOF FOR CONVERTING RECIPROCATING ROTARY MOTION TO CONTINUOUS ROTARY MOTION," by Raymond et al., filed Oct. 31, 2017, the disclosures of which are incorporated herein by reference in their entireties.

STATEMENT REGARDING FEDERALLY SPONSORED RESEARCH OR DEVELOPMENT

This invention was developed under Contract No. DE-NA0003525 between the United State Department of Energy and National Technology & Engineering Solutions of Sandia, LLC, for the operation of the Sandia National Laboratories. The U.S. Government has certain rights in the invention.

BACKGROUND OF THE INVENTION

The present invention relates to the field of motors, and specifically to fluid-powered linear motors with axial or rotary pistons coupled to a harmonic drive for drilling.

Downhole drills are used for oil drilling, geothermal drilling, and other deep earth penetration applications. Downhole drills include rotary and percussive drills. For nearly any drilling method, rotational energy must be transferred downhole in order to promote rock reduction. The drill bit may be rotated by an electric motor or fluid/hydraulic system. The rotating action can be produced either at the surface or near the drill bit. In addition to rotational cutting, drills may also be pressurized or mechanically actuated to force the drill bit to hammer against the rock/earth. Prior art rotation systems and methods are complex, require large form factors to create sufficient torque, and require a high degree of maintenance.

The most common method of downhole energy transfer is rigid drill pipe. The drill pipe is rotated from the surface, with drilling joints added for tripping (moving in and out of the hole). For this type of system, the entire drill string rotates. Typically, a rotary table system or a top drive is used to drive the drill string. Although it is well suited for vertical drilling, it has limited applications in directional drilling because the drill string curvature and thrust loads generate additional torque that the surface based motor must overcome and drill pipe survive.

Downhole techniques used to generate rotation such as positive displacement motors (PDMs) are limited in their temperature range due to the use of elastomers. Energy resources like geothermal and deep oil and gas wells lie in hot (160° C.-300° C.), and often hard rock. The high-temperatures limit the use of PDMs in those environments. Additionally, while PDM motors are used for the vast majority of directional drilling operations, they introduce significant lateral vibration to the drilling assembly as the multi-lobed helical rotor comprising the power section undergoes nutation within the motor housing to generate rotor rotation. This lateral vibration is detrimental to both hardware life and directional drilling operations.

U.S. Pat. No. 9,447,798, entitled "Fluid powered Linear Piston Motor with Harmonic Coupling," by David W. Raymond, granted Sep. 20, 2016, the disclosure of which is incorporated by reference in its entirety, discloses a motor that includes a module assembly incorporating an axially-cycled piston, the disclosure of which is incorporated by reference in its entirety. The piston axial motion is torque coupled to convert the axial motion into rotary motion. The method does not require elastomers for operation and the rotor operates concentrically thereby not inducing lateral vibration.

U.S. Pat. No. 10,100,850, entitled "Modular Fluid Powered Linear Piston Motors with Harmonic Coupling," by David W. Raymond, granted Oct. 16, 2018, the disclosure of which is incorporated by reference in its entirety, discloses a modular fluid powered linear piston motor with harmonic coupling that includes a drive train to convert reciprocating motion from a piston into rotary motion in an output shaft. Rotation is accomplished with roller balls captured between an inner race and a drive liner to facilitate rotation between a rotor and a stator. These roller balls must operate with low friction to enable smooth operation of the motor. Additionally, they must operate under a high contact load as they are in the preloaded and active load path to transmit torque to the output rotor. Finally, they must potentially operate with an abrasive drilling fluid under the rigors of high ambient temperatures and high friction conditions.

U.S. patent application Ser. No. 16/153,265, entitled "Fluid-Powered Linear Motor with Rotary Pistons and Motion Rectifier," filed Oct. 5, 2018, by David W. Raymond, the disclosure of which is incorporated by reference in its entirety, discloses systems and methods that use rotary pistons to overcome limitations of: 1) many pistons are required to generate the requisite torque to drive a drill bit downhole, and 2) any particulates in the drilling fluid would potentially settle out on the upper surfaces of the piston and eventually restrict operation.

A limitation of these prior configurations is that ball transfers are used to transmit the motive forces resulting in sliding contact within the ball transfer seat. Ball transfers, and in particular, ball transfers with polycrystalline diamond bearing support, are the subject of co-owned U.S. patent application Ser. No. 15/726,506 entitled "BALL TRANSFER MECHANISM WITH POLYCRYSTALLINE DIAMOND BEARING SUPPORT," filed Oct. 6, 2017, by David W. Raymond, incorporated by reference in its entirety. These ball transfer mechanisms create sliding contact between the ball transfer and the support that contribute to increased friction, increased abrasive wear and decreased performance and efficiency.

What is needed are systems and/or methods that overcome one or more of these limitations or provides other advantageous features.

Other features and advantages will be made apparent from the present specification. The teachings disclosed extend to those embodiments that fall within the scope of the claims, regardless of whether they accomplish one or more of the aforementioned needs.

SUMMARY OF THE INVENTION

According to an embodiment of the disclosure, a harmonic drive assembly is disclosed that includes a harmonic drive rotor comprising one or more track grooves, a harmonic drive reciprocating ring disposed around the harmonic drive rotor, and at least one ball disposed within each of the track grooves and outer races. The harmonic drive reciprocating ring includes a housing and one or more ball transfer outer race housings that define ball transfer outer races. The ball track grooves form a recirculating path around the harmonic drive to convert harmonic, cycloidal or polynomial motion in the harmonic drive reciprocating ring to rotary motion According to an embodiment of the disclosure, a linear motor module is disclosed that includes a primary rotor assembly comprising a harmonic drive rotor comprising two or more track grooves, a harmonic drive reciprocating ring coupled to the primary rotor assembly, at least one ball disposed within each of the track groves and ball transfer outer races, a first and a second piston assembly coupled to opposing axial ends of the harmonic drive reciprocating ring, a first and a second fluid chamber on opposing axial ends of the harmonic drive reciprocating ring configured for a fluid to alternatingly pressurize the first and second fluid chambers to impart reciprocating linear motion to the harmonic drive reciprocation ring, which imparts continuous rotary motion to the primary rotor assembly. The harmonic drive reciprocating ring includes two or more ball transfer outer race housings that define ball transfer outer races.

According to another embodiment of the disclosure, a linear motor is disclosed that includes two or more linear motor modules. At least one of the two or more linear motor modules includes a primary rotor assembly comprising a harmonic drive rotor comprising two or more track grooves, a harmonic drive reciprocating ring coupled to the primary rotor assembly, at least one ball disposed within each of the track groves and outer races, a first and a second piston assembly coupled to opposing axial ends of the harmonic drive reciprocating ring; a first and a second fluid chamber on opposing axial ends of the harmonic drive reciprocating ring configured for a fluid to alternatingly pressurize the first and second fluid chambers to impart reciprocating linear motion to the harmonic drive reciprocation ring, which imparts continuous rotary motion to the primary rotor assembly. The harmonic drive reciprocating ring comprising two or more ball transfer outer race housings that define ball transfer outer races.

According to another embodiment of the disclosure, a rotary piston motor module is disclosed that includes a primary rotor assembly including a harmonic drive rotor, a secondary reciprocating rotor assembly coupled to the primary rotor assembly, the secondary reciprocating rotor assembly comprising a reciprocating rotary piston assembly and a helical drive screw, a helical drive reciprocating ring coupled to the helical drive screw, and a harmonic drive reciprocating ring coupled to the helical drive reciprocating ring and the harmonic drive rotor, at least one ball disposed within each of the ball track grooves and the ball transfer outer races. The ball track grooves form a recirculating path around the harmonic drive to convert harmonic, cycloidal or polynomial motion in the harmonic drive reciprocating ring to rotary motion. The harmonic drive reciprocating ring is coupled to the helical drive reciprocating ring and the harmonic drive rotor so that reciprocating motion of the secondary reciprocating rotor assembly imparts linear motion to the helical and harmonic reciprocating rings so that the harmonic reciprocating ring rotates the helical drive screw to impart continuous rotary motion to the primary motor assembly. The harmonic drive rotor comprising two or more ball track grooves. The harmonic drive reciprocating ring includes two or more ball transfer outer race housings that define ball transfer outer races.

According to another embodiment of the disclosure, a rotary piston motor is disclosed that includes two or more motor modules. At least one of the two or more motor modules includes a primary rotor assembly comprising a harmonic drive rotor, a secondary reciprocating rotor assembly coupled to the primary rotor assembly, a helical drive reciprocating ring coupled to the helical drive screw; a harmonic drive reciprocating ring coupled to the helical drive reciprocating ring and the harmonic drive rotor, at least one ball disposed within each of the ball track grooves and the ball transfer outer races. The ball track grooves form a recirculating path around the harmonic drive to convert harmonic, cycloidal or polynomial motion in the harmonic drive reciprocating ring to rotary motion. The harmonic drive reciprocating ring is coupled to the helical drive reciprocating ring and the harmonic drive rotor so that reciprocating motion of the secondary reciprocating rotor assembly imparts linear motion to the helical and harmonic reciprocating rings so that the harmonic reciprocating ring rotates the helical drive screw to impart continuous rotary motion to the primary motor assembly. The harmonic drive rotor comprising two or more ball track grooves. The secondary reciprocating rotor assembly comprising a reciprocating rotary piston assembly and a helical drive screw. The harmonic drive reciprocating ring comprising two or more ball transfer outer race housings that define ball transfer outer races.

According to another embodiment of the disclosure, a method for converting fluid energy to rotational energy is disclosed that includes providing fluid to a motor module that includes a primary rotor assembly including a harmonic drive rotor, diverting a portion of the fluid to energize a harmonic drive reciprocating ring to impart linear and reciprocative motion, and transferring linear energy from the harmonic drive reciprocating ring via rolling motion to the harmonic drive rotor to convert harmonic, cycloidal or polynomial motion in the harmonic drive reciprocating ring to rotary motion of the harmonic drive rotor.

According to various embodiments of the disclosure, harmonic drives and motors using the disclosed harmonic drives are disclosed that use rolling motion to replace the sliding contact at the ball transfer support to reduce friction, reduce abrasive wear of internal components, improve performance, improve efficiency and reduce manufacturing costs of the overall assembly.

One advantage of the present disclosure are motors having improved torque characteristics.

Another advantage of the present disclosure are motors that do not introduce lateral vibration to a drilling assembly.

Another advantage of rotary pistons is the drilling fluid is allowed to flow through the power section and is thereby immune to particulates settling on the piston lands.

Another advantage is that preferential torque and speed characteristics may be prescribed by specification of design parameters governing the operation of the rotary piston/helical drive screw/harmonic drive combination comprising the assembly.

Another advantage is that rolling motion is prescribed at the ball transfer interfaces resulting in reduced friction and reduced abrasive wear.

Alternative exemplary embodiments relate to other features and combinations of features as may be generally recited in the claims.

BRIEF DESCRIPTION OF THE DRAWINGS

FIG. 3 illustrates a [1:2] harmonic drive reciprocating ring according to an embodiment of the disclosure with one cycle per revolution on the harmonic drive rotor and two cycles per revolution on the ball transfer outer race.

FIG. 5 is a table showing combinations between Rotor Harmonics A and Stator Harmonics B for the Advanced Harmonic Drive.

FIGS. 8 and 8A-8F are a side view and indicated partial cross section views of an axial piston motor module according to an embodiment of the disclosure with liner assembly cutaway.

FIG. 21 illustrates a [3:6] harmonic drive reciprocating ring according to an embodiment of the disclosure with three cycles per revolution on the harmonic drive rotor and six cycles per revolution on the ball transfer outer race.

FIG. 24A is an illustration of cut away 1-1 of the motor module of FIG. 24.

FIG. 24B is an illustration of cut away 2-2 of the motor module of FIG. 24.

FIG. 24C is an illustration of cut away 3-3 of the motor module of FIG. 24.

FIG. 24D is an illustration of cut away 4-4 of the motor module of FIG. 24.

FIG. 24E is an illustration of cut away 5-5 of the motor module of FIG. 24.

FIG. 24F is an illustration of cut away 6-6 of the motor module of FIG. 24.

FIG. 24G is an illustration of cut away 7-7 of the motor module of FIG. 24.

FIG. 24H is an illustration of cut away 8-8 of the motor module of FIG. 24.

The application will become more fully understood from the following detailed description, taken in conjunction with the accompanying figures.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

The present disclosure is directed to systems and methods that use advanced harmonic drives, advanced helical drives, and combinations thereof with 1) motors with axial pistons and reciprocating linear rings to convert reciprocative axial motion to continuous rotary motion, and 2) motors with rotary pistons and reciprocating linear rings to rectify reciprocative rotary motion to continual rotary motion to improve performance over prior configurations. The axial piston configuration presents a convenient solution for generating rotary shaft power. The rotary piston configuration increases torque output using rotational pistons whereby output torque is proportional to the length of the rotary pistons; hence the pistons can be prescribed of the length necessary to generate a desired torque. Furthermore, an increased number of pistons may be used for greater torque. The form factor presented by rotational pistons allows flow through the piston section so fluid particulates will not settle out within the piston assembly. The disclosed motors have improved torque, do not introduce lateral vibration and can operate at high temperatures. The rotary piston configuration has improved particle settling characteristics.

Figure 1:
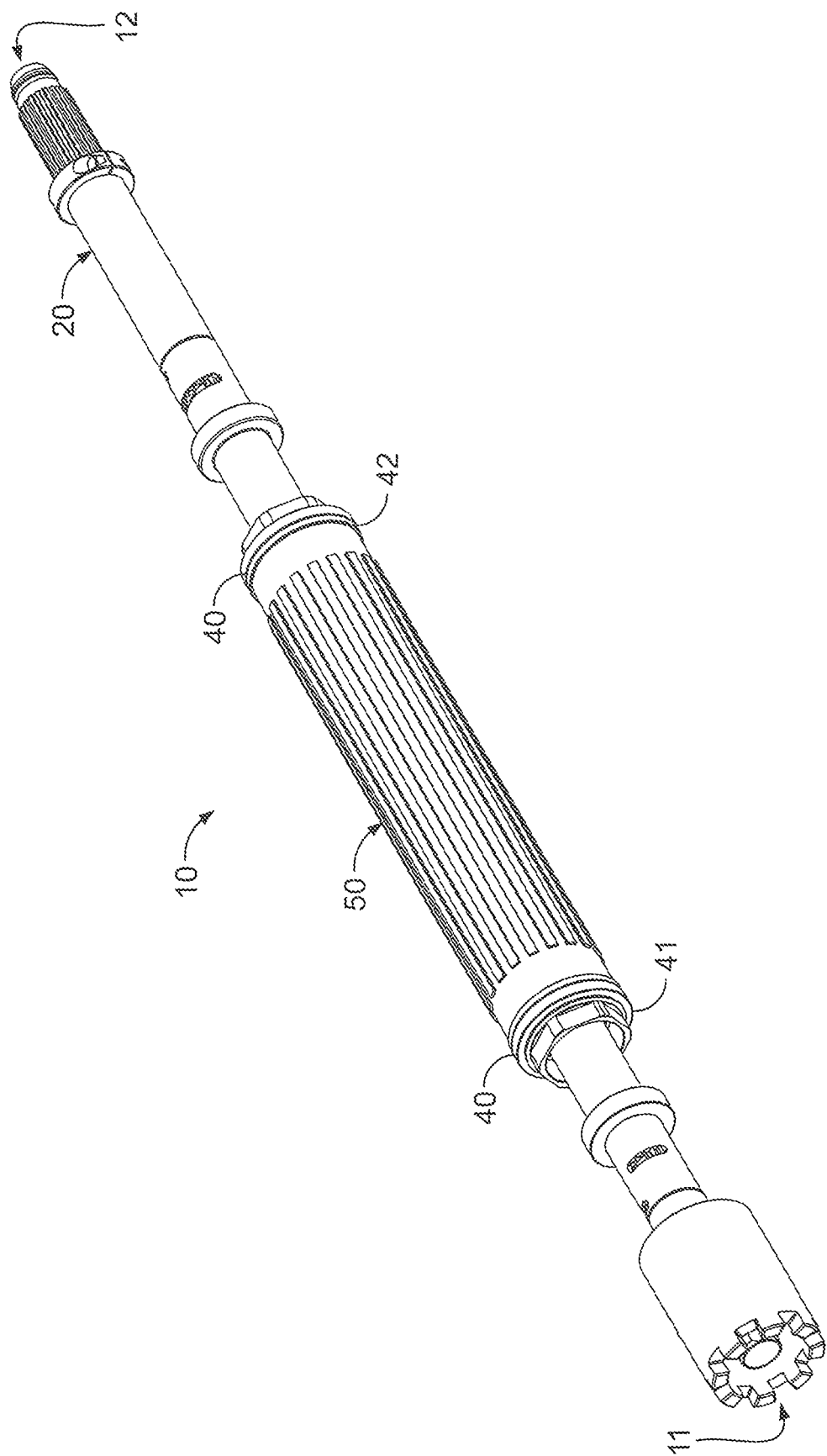
FIG. 1 illustrates an axial piston internal power section portion of a fluid-powered linear motor module according to an embodiment of the disclosure.

FIG. 1 illustrates an internal power section of a fluid-powered axial or linear motor module (internal power section) 10 according to an embodiment of the disclosure. The linear motor module or internal power section 10 may provide power to or be coupled to a tool or other component or other power section that uses or receives the generated rotary motion of the internal power section 10. As can be seen in FIG. 1, the internal power section 10 includes a primary rotor assembly 20, a linear piston assembly 40 and a harmonic drive reciprocating ring (harmonic drive ring) 50. Additional components not seen are discussed in further detail below. The internal power section 10 has aft end or fluid inlet 11 and a fore end or fluid outlet 12. The internal power section 10 receives fluid at the aft end that drives the primary rotor assembly 20 that drives a harmonic reciprocating ring 50 to drive a harmonic drive rotor 60 (see FIG. 2) attached to the primary rotor assembly 20 to impart a continual rotation thereto, the fluid discharged thereafter from the fluid outlet 12.

The linear piston assembly 40 includes an aft piston assembly 41 and a fore piston assembly 42. The aft and fore piston assemblies 41, 42 provide surface area that receives fluid pressure when the fluid chambers are alternatingly pressurized to drive the harmonic drive ring 50 in reciprocating linear axial directions. The aft and fore piston assemblies 41, 42 are attached to the harmonic drive ring 50 (see FIGS. 1, 3 and 3A).

Figure 2:
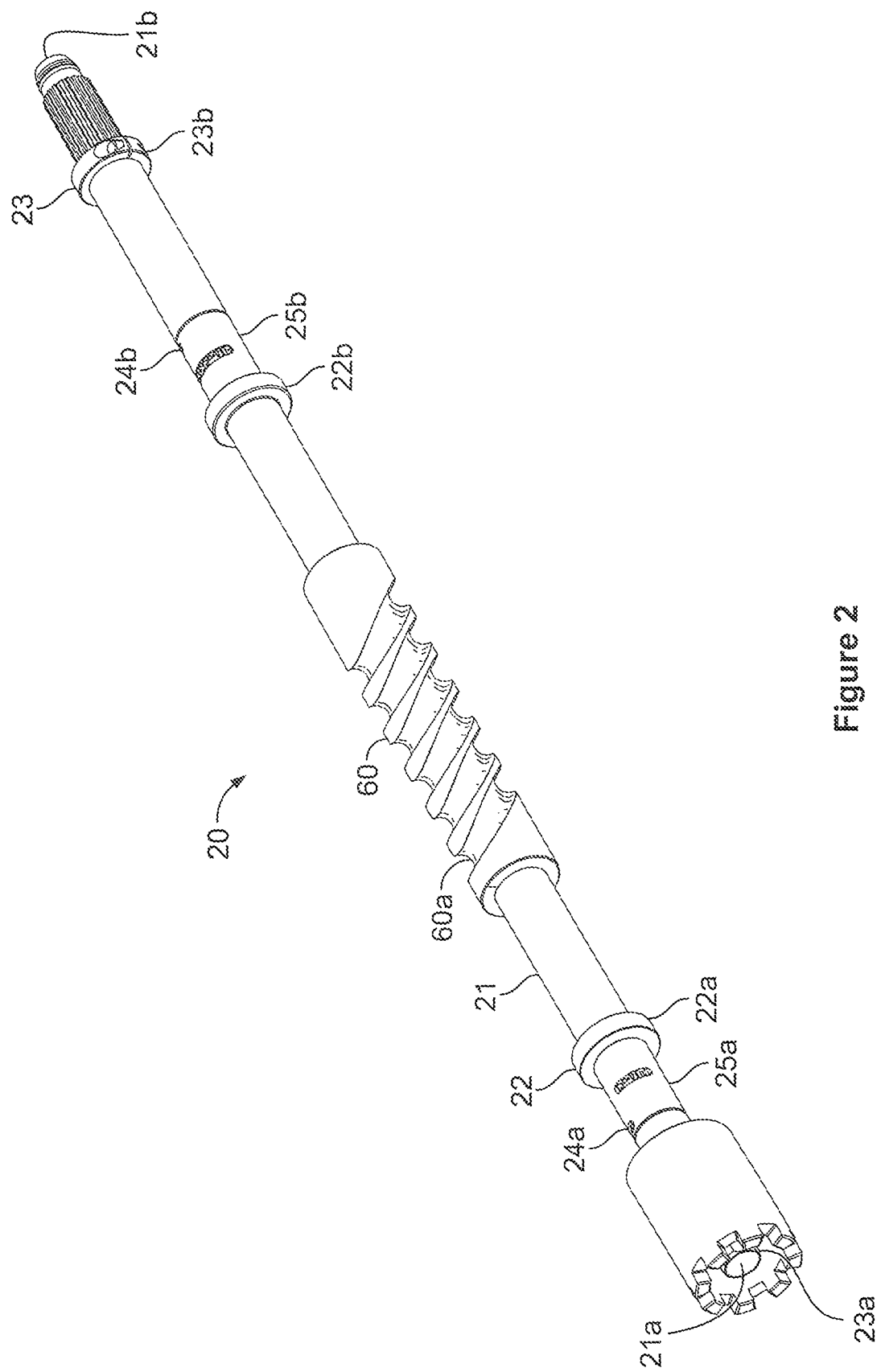
FIG. 2 illustrates an axial piston primary rotor assembly and harmonic drive rotor disposed thereupon according to an embodiment of the disclosure.

FIG. 2 illustrates a primary rotor assembly 20 and harmonic drive rotor 60 according to an embodiment of the disclosure. The primary rotor assembly 20 ports fluid to the fore and aft piston chambers 28a, 28b, (see FIG. 7) as it rotates. The piston chambers 28a, 28b are defined by the primary rotor shaft 21, thrust bearing flanges 22 piston assemblies, 41, 42 and liner 72. The primary rotor assembly 20 produces torque in response to the harmonic drive ring 50 moving across the harmonic drive rotor 60. The primary rotor assembly 20 includes a primary rotor shaft 21, thrust bearing flanges 22, and end retainers 23. The primary rotor assembly 20 also includes an aft primary shaft fluid outlet (pressure) valve 24a and an aft primary shaft fluid inlet (exhaust) valve 25a and a fore primary shaft fluid outlet (pressure) valve 24b and a fore primary shaft fluid inlet (exhaust) valve 25b that provide fluid to the aft and fore fluid chambers, respectively.

The thrust bearing flanges 22 react the force from the action of the harmonic drive reciprocating ring 50 (FIG. 1). There are two thrust bearing flanges 22, an aft thrust bearing flange 22a proximate the fluid inlet 21a and a forward thrust bearing flange 22b proximate the fluid outlet 21b.

The end retainers 23 retain the various components comprising the subassembly on the primary rotor shaft. There are two end retainers 23, a first end retainer or locknut 23a disposed on the shaft 21 proximate the fluid inlet 21a and a second end retainer or shaft collar 23b disposed proximate the fluid outlet 21b.

The primary shaft fluid outlet valves 24a, 24b allow a portion of the fluid entering the shaft fluid inlet 21a and flowing through a shaft internal pressurized flow channel (not shown), which flows between the primary shaft fluid inlet 21a and the primary shaft fluid outlet 21b, to exit the shaft internal pressurized flow channel and drive the harmonic drive reciprocating ring 50. The primary fluid inlet valve 25 allows the fluid that has been exhausted by the harmonic drive reciprocating ring 50 to return to a shaft internal flow channel separate from the pressurized fluid flowing through the shaft internal pressurized flow channel. Pressurized fluid exits at valve 24a and pressurizes chamber A causing exhaust fluid in Chamber B to enter valve 25b to return to the shaft internal flow channel. When the harmonic drive reciprocating ring reaches the end of its stroke, pressurized fluid exits at valve 24b and pressurizes chamber B causing exhaust fluid in Chamber A to enter valve 25a to return to the shaft internal flow channel. Both the pressurized fluid flowing through the shaft internal pressurized flow channel and the fluid that has performed work by driving the harmonic drive reciprocating ring 50 are discharged as separate streams at the shaft fluid outlet 21b.

The harmonic drive rotor 60 is a cylindrical sleeve that has ball track grooves 60a that allow seating of balls in harmonic drive reciprocating ring 50. The balls may be referred to as ball transfers as the balls "transfer" the thrust load in the ring produced by differential pressure across the harmonic drive reciprocating ring 50 into an applied force on the harmonic drive rotor 60 to produce torque in the rotor. In this exemplary embodiment, the harmonic drive rotor 60 includes six ball track grooves 60a. In other embodiments, the harmonic drive rotor 60 may include one or more ball track groves 60a. In an embodiment, only one ball track groove is required if the piston is not bi-directional. In another embodiment, the harmonic drive rotor 60 may include two or more ball track grooves 60a. The number of grooves is determined by the torque/performance requirements. In yet other embodiments, the harmonic drive rotor 60 may include a number of ball track grooves 60a as necessary to transmit the torque requirements of its intended use. The ball track grooves 60a form a recirculating path around the harmonic drive to convert harmonic, cycloidal or polynomial motion in the harmonic drive reciprocating ring 50 to rotary motion in the primary rotor assembly. The harmonic drive rotor 60 converts reciprocating motion in the harmonic drive reciprocating ring 50 to continuous rotary motion in primary rotor assembly 20. The harmonic drive rotor 60 is joined to, affixed or otherwise attached to the primary rotor assembly 20 so that imparting rotation to the harmonic drive rotor 60 imparts rotation to the primary rotor assembly 20.

Figure 3A:
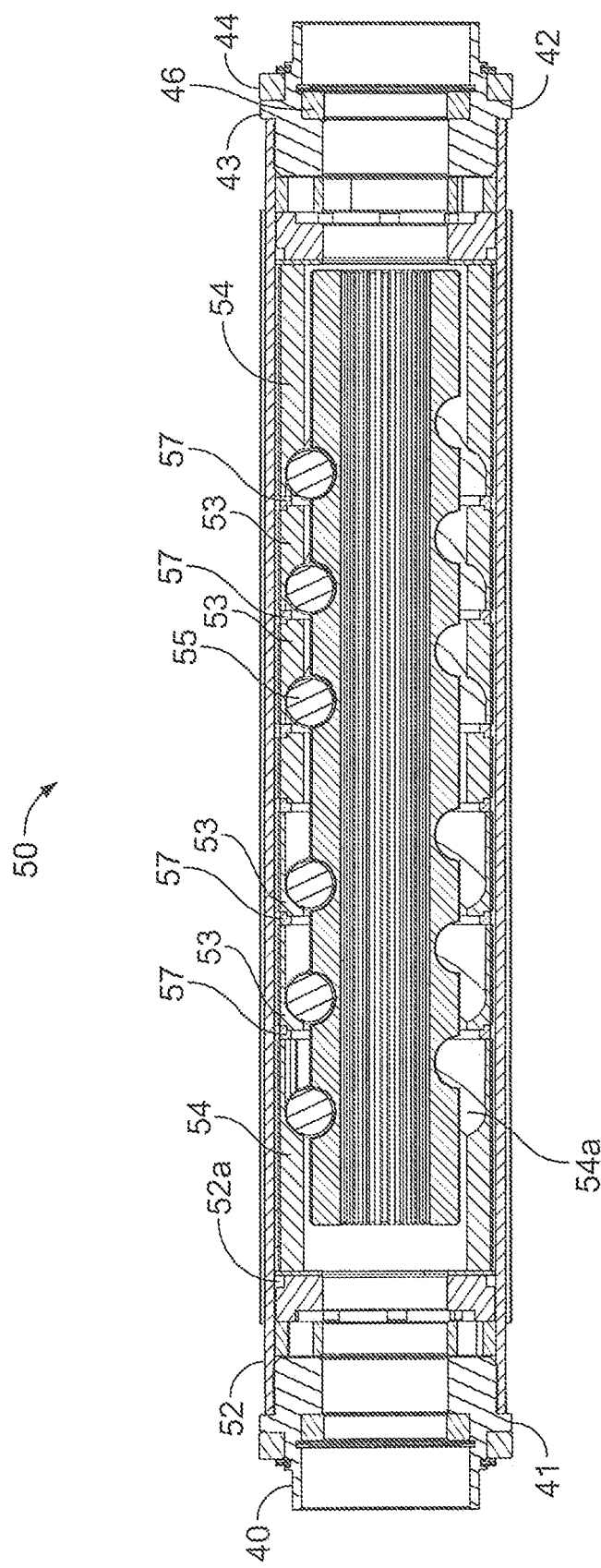
FIG. 3A is a longitudinal cross section view of the harmonic drive reciprocating ring of FIG. 3.

FIGS. 3 and 3A illustrate a linear piston assembly 40 and a harmonic drive reciprocating ring (harmonic drive ring) 50 according to an embodiment of the disclosure. The linear piston assembly 40 includes piston body 43 and outer diameter piston seal 44 and inner diameter piston seal 46. The linear piston assembly 40 receives fluid from valves 24 and exhausts fluid from valves 25 as described above.

As can further be seen in FIGS. 3 and 3A, the harmonic drive ring 50 includes a housing 52, a plurality of inner ball transfer outer race housings 53 and an outer ball transfer race housing 54 that include a plurality of ball transfer outer races 53a and 54a and a plurality of track, roller balls (balls) 55 disposed within the plurality of ball transfer outer races 53a and 54a. The plurality of inner ball transfer outer race housings 53 and outer ball transfer race housing 54 may be referred to as the harmonic drive outer race. The plurality of ball transfer outer races 53a and 54a contain one or more balls 55 so that a portion of the balls extend towards the axial centerline of the housing 52 beyond the inner wall 52a of the housing 52 and the plurality of ball transfer outer race housings 53 and 54. Shims 57 are installed at assembly between the outer race housings to ensure dimensional fit between the outer race housings and harmonic drive rotor ball track grooves 60a.

The harmonic drive ring 50 is disposed around and concentric to the harmonic drive rotor 60 (FIG. 2). The one or more balls 55 engage and track in corresponding harmonic track grooves 60a of the harmonic track rotor 60 (FIG. 2). In such a manner, the balls 55 and harmonic track grooves 60a are in load bearing contact and the balls 55 rotate in the ball transfer outer race 54 as the harmonic drive rotor 60 rotates.

Figure 4:
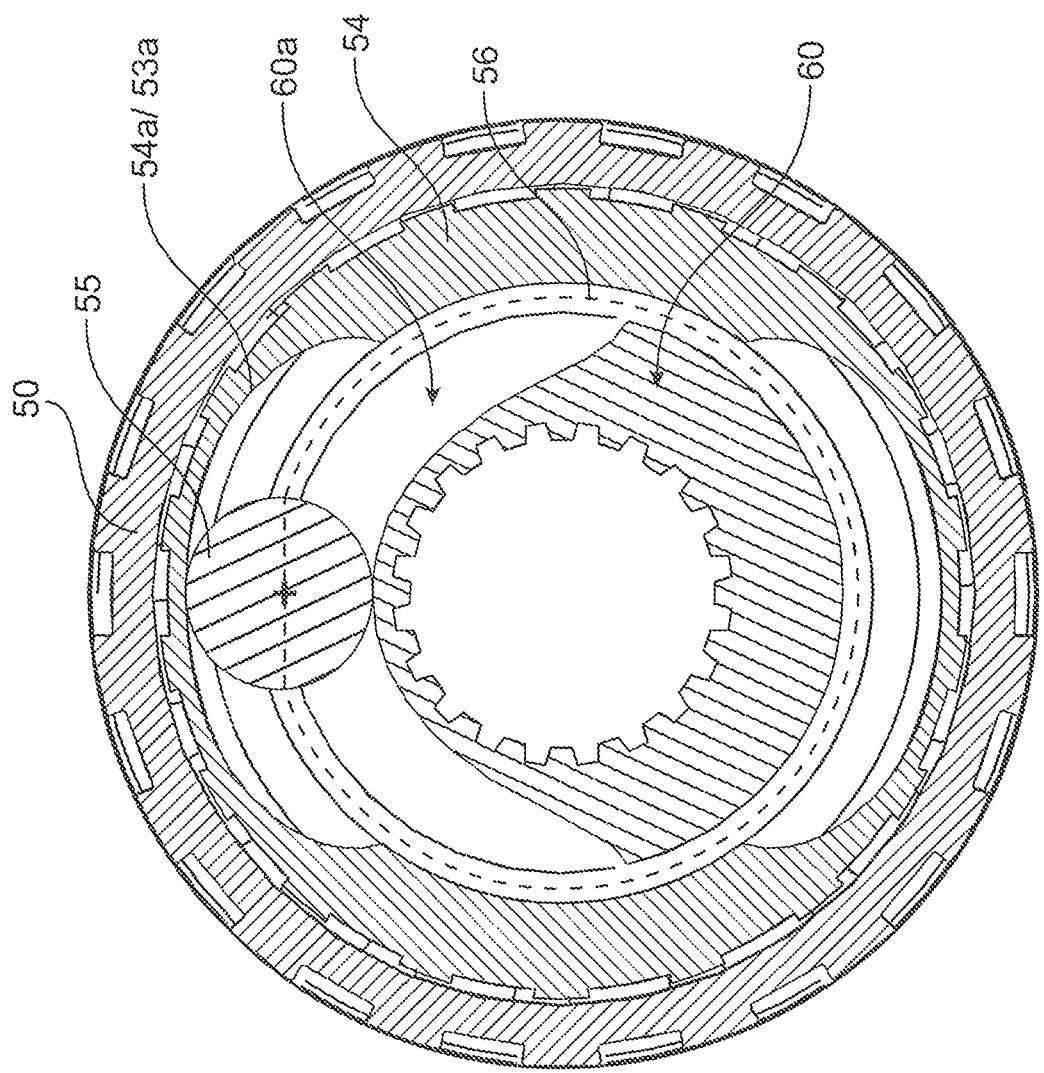
FIG. 4 is a lateral cross section view of the harmonic drive reciprocating ring of FIG. 3.

FIG. 4 is a lateral cross-sectional view through a [1:2] harmonic drive with the harmonic drive ring 50 illustrating the planetary drive train nature of the assembly comprising sun, planet, ring and carrier components corresponding to the harmonic drive rotor groove 60a, ball 55, outer race 53a/54a and ball orbit diameter 56, respectively. As the rotor (sun) rotates, the ball (planet) will orbit the rotor (sun). In accordance with design convention, the diameters of these components must be dimensioned proportionally to ensure rolling motion at their contact points within the harmonic drive.

FIG. 5 is a table of values showing typical rotor-stator combinations [A:B] for harmonic drive assemblies; "alpha" values, governing the ratio of outer race diameter on the race retainer 53a/54a to the inner race diameter on the harmonic drive rotor 60a, is computed as the ratio B divided by A (i.e., B/A), and establishes the criterion for pure rolling motion within the harmonic drive assembly.

Figure 6:
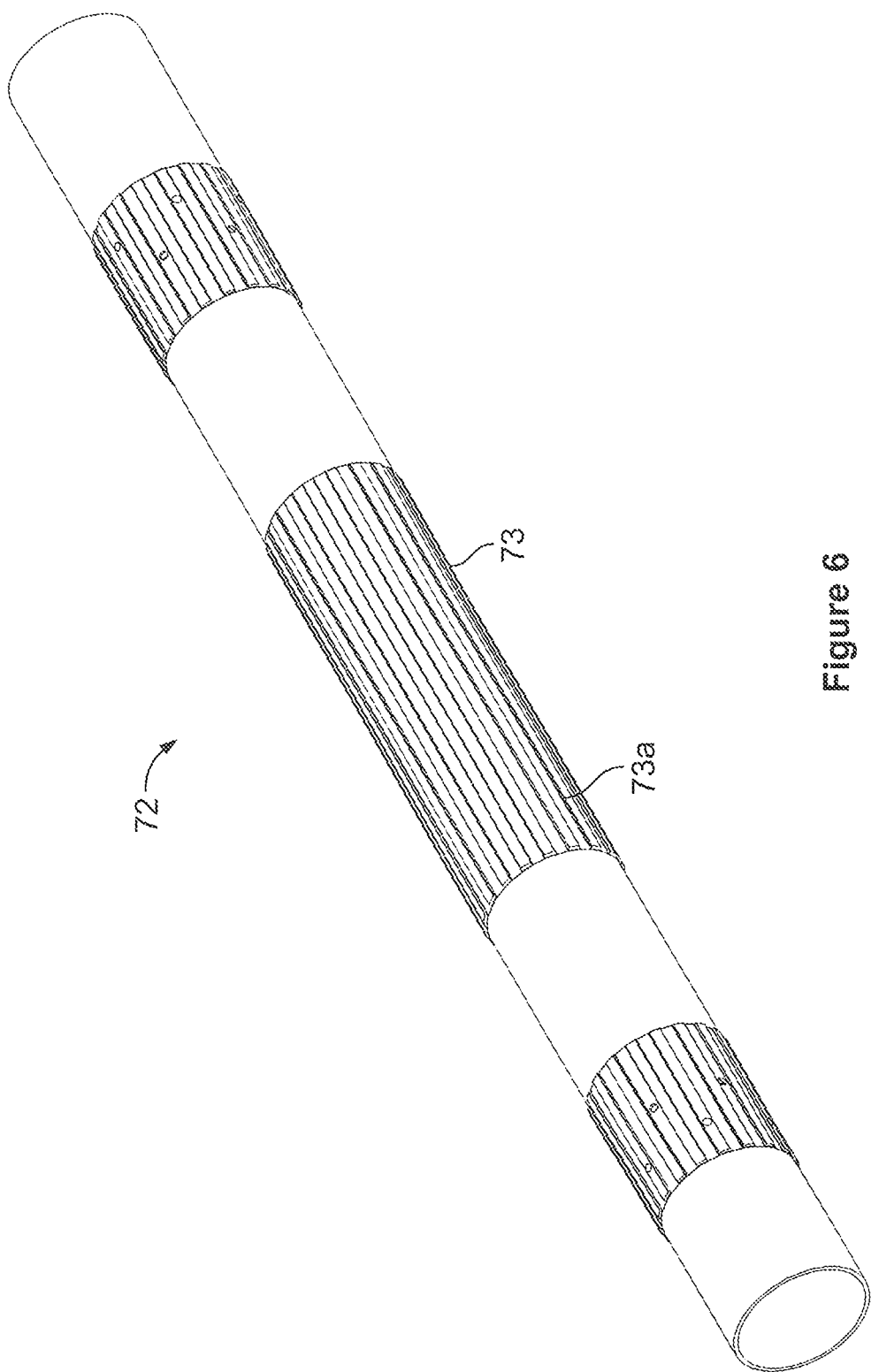
FIG. 6 illustrates an axial piston liner assembly according to an embodiment of the disclosure.
Figure 6A:
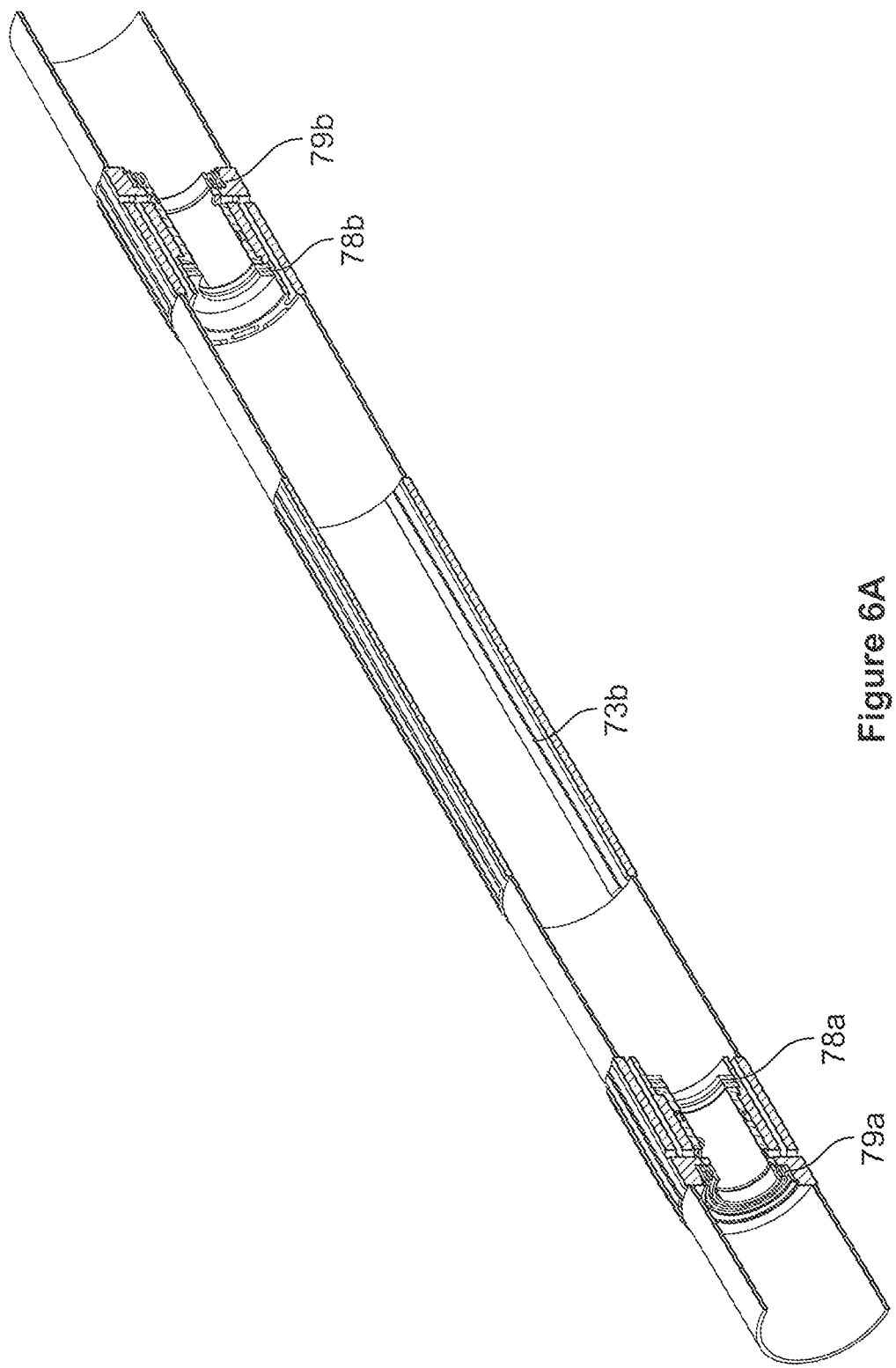
FIG. 6A is a cross section view of the liner assembly of FIG. 6.

FIGS. 6 and 6A illustrates a liner assembly (liner) 72 according to an embodiment of the disclosure. In this exemplary disclosure, the liner 72 is formed from multiple segments for ease of assembly of the motor module 80 (see FIG. 7). In other embodiments, the liner 72 may be formed of one or more components. The liner 72 acts as a stator and forms the interface between the motor case (shell) and the rotor assembly shown in FIG. 7. As can be seen in FIGS. 6 and 6A, the liner 72 includes a housing 73 having external splines 73a and internal splines 73b. The external splines 73a engage with the motor case or shell 101 (see FIG. 9) to prevent rotation of the liner 72 as the liner 72 reacts the torque from the reciprocating ring (50) on the interior surface using internal splines 73b to prevent the ring 50 from rotating. Thrust bearings 78a and 78b are shown installed within the liner in FIG. 6A and act to react rotor thrust loads during operation.

Figure 7:
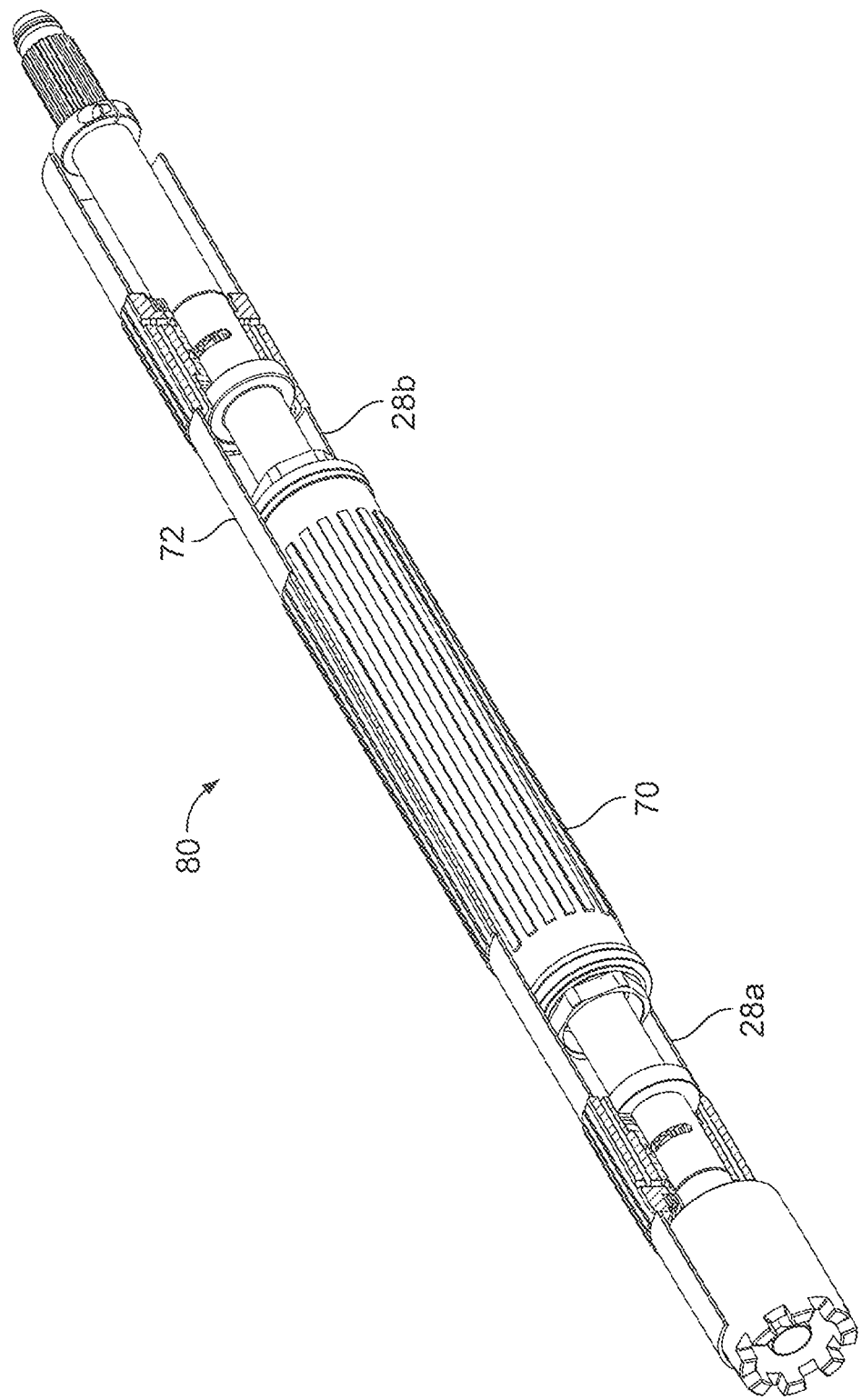
FIG. 7 is a partial cross section view of an axial piston motor module according to an embodiment of the disclosure with liner assembly cutaway.

FIG. 7 is a partial cross section view of a motor module 80 according to an embodiment of the disclosure with the liner 72 cutaway. The rotor assembly 70 shown in FIG. 7 is shown installed in the cut-away of the liner 72. The aforementioned thrust bearings 78a and 78b and rotary bearings 79a and 79b (shown in FIG. 6A) integrate the rotor assembly with the liner.

FIG. 8 shows the complete motor module 80 with sectional references for FIGS. 8A-8F indicated. As can be seen in FIGS. 8A-8F, the liner 72a further includes fluid injection ports 74 (fluid injection port 74a—Chamber A) and fluid relief ports 75 (fluid ejection port 75a—Chamber A) where Chamber A is the volume in liner 72b between the piston 41 and the liner 72a. The liner 72e further includes fluid injection ports 74 (fluid injection port 74b—Chamber B) and fluid relief ports 75 (fluid ejection port 75B—Chamber B) where Chamber B is the volume in liner 72d between the piston 42 and the liner 72e. These are described below using the various sections through the motor module 80 in FIG. 8.

FIGS. 8A-8F shows how alternatively pressurizing and exhausting Chambers A and B impart reciprocative axial motion to motor pistons to generate rotation and torque in the output rotor. As discussed below, Chamber A is pressurized while Chamber B is concurrently exhausted to energize the rotor assembly to impart forward motion to the axial pistons to generate clockwise motion in the output rotor, followed by alternatively porting Chamber B to pressurize while Chamber A is concurrently exhausted to energize the rotor assembly to impart backward motion to the axial pistons to generate clockwise motion in the output rotor.

The fluid injection ports 74 receive fluid from the primary shaft fluid outlet (pressure) valve 24 (see FIG. 8A section 1-1 and 8D section 4-4) and port it to the axial piston Chambers A and B (see FIG. 8C section 3-3 and see FIG. 8F section 6-6-). Fluid injection port 74*a* connects rotor primary shaft fluid outlet valve 24*a* to rotary piston Chamber A via flow through the liner 72*a*; fluid injection port 74*b* connects rotor primary shaft fluid outlet valve 24*b* to rotary piston Chamber B via flow through the liner 72*e*. These fluid injection ports 74*a* & 74*b* connect alternatively during rotor rotation to pressurize the chambers for axial piston reciprocation. (Note the referenced figures show the beginning of Chamber A pressurization and completion of Chamber B pressurization corresponding to clockwise rotation of the rotor assembly when viewed from the aft end of the assembly.)

The fluid relief port 75 receives fluid from the rotary piston chambers (see FIG. 8B section 2-2 and see FIG. 8E section 5-5) for ejection to the rotor primary shaft fluid inlet (exhaust) valve 25. Fluid injection port 75*a* (see FIG. 8B section 2-2) connects rotor primary shaft fluid outlet valve 25 to rotary piston Chamber A; fluid injection port 75*b* (see FIG. 8E section 5-5) connects rotor primary shaft fluid outlet valve 25 to rotary piston Chamber B. These fluid ejection ports 75*a* & 75*b* connect alternatively during rotor rotation to exhaust the chambers for rotary piston reciprocation.

The fluid relief port 75*a* & 75*b* direct fluid to the exhaust manifold described in FIG. 10 below.

Figure 9:
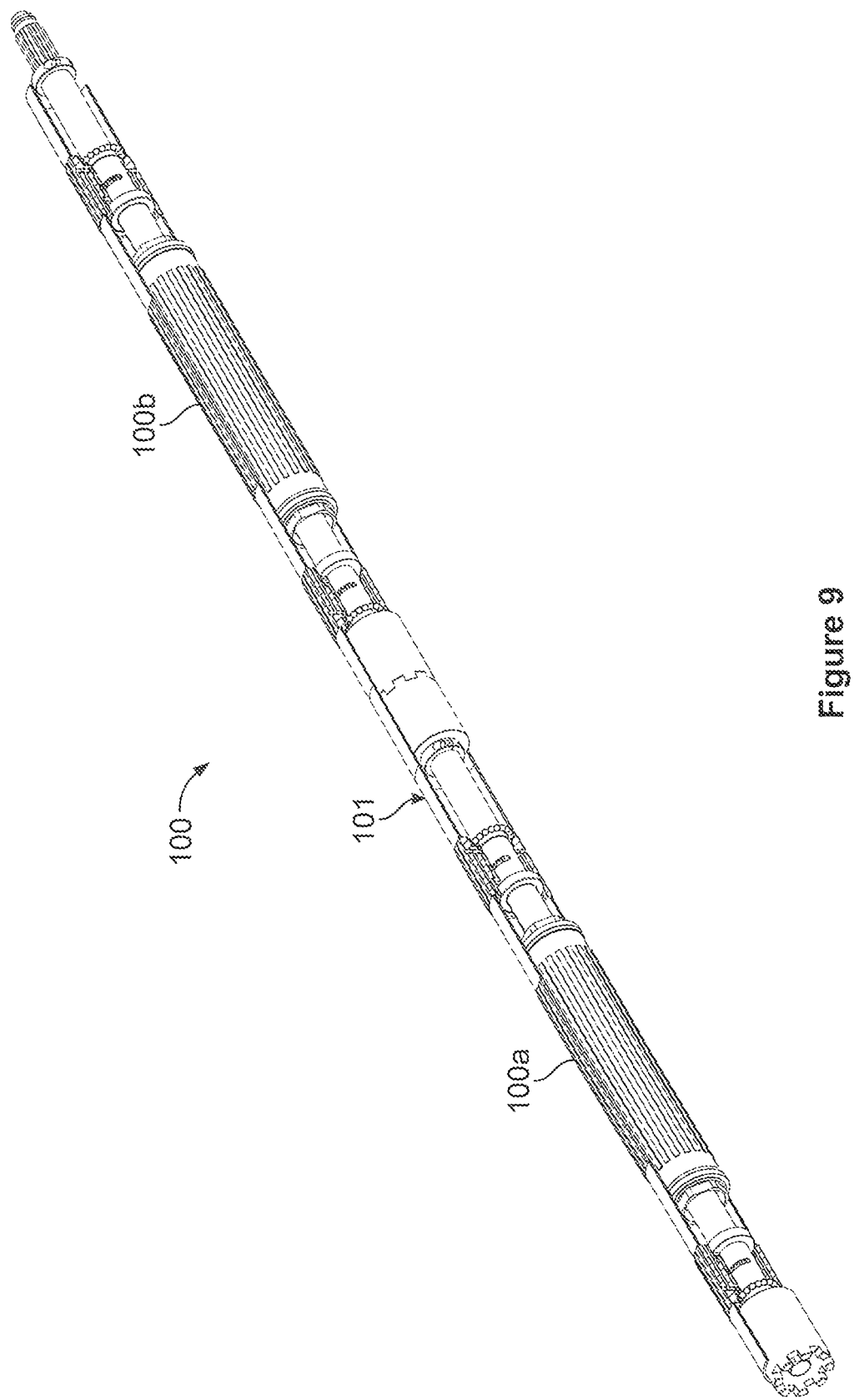
FIG. 9 illustrates a fluid-powered axial piston linear motor according to an embodiment of the disclosure.

FIG. 9 illustrates a partial cut away view of a fluid-powered linear motor (motor) 100 according to an embodiment of the disclosure. As can be seen in FIG. 9, the motor 100 includes a first motor module 100*a* and a second motor module 100*b*. In other embodiments, a motor 100 may include two or more modules depending on the torque requirements of the application. The motor 100 requires the second motor module 100*b* to be assembled rotationally clocked from the first motor module 100*a* to provide a continuous output torque as the individual modules can then transition the respective dwell point or motion reversals of their piston reciprocation while the other module is providing rotor power. Additional modules can be added and similarly offset to allow continuous rotor torque during constituent module dwell points and provide increased torque delivery for the overall assembly.

Also shown in FIG. 9 is a case or shell 101 that accommodates installation of the constituent motor modules including a splined bore to receive liner assembly 72 and mate with housing 73 and external splines 73*a*. The shell 101 is secured (preloaded) with a connection (threaded or welded) to hold the motor in place.

It should be appreciated that the primary rotor shaft of the motor may be connected or coupled to a rotary tool or device, such as, but not limited to a rotary cutter or bit, via a rotating collar at the forward end of the shell. Likewise, the aft end of the shell may be connected to a drillstring such that the motor introduces rotary motion relative to the drillstring connection. In addition, the motor receives a fluid from a drillstring connection or other fluid supply source as may be appreciated by one of ordinary skill in the art.

Figure 10:
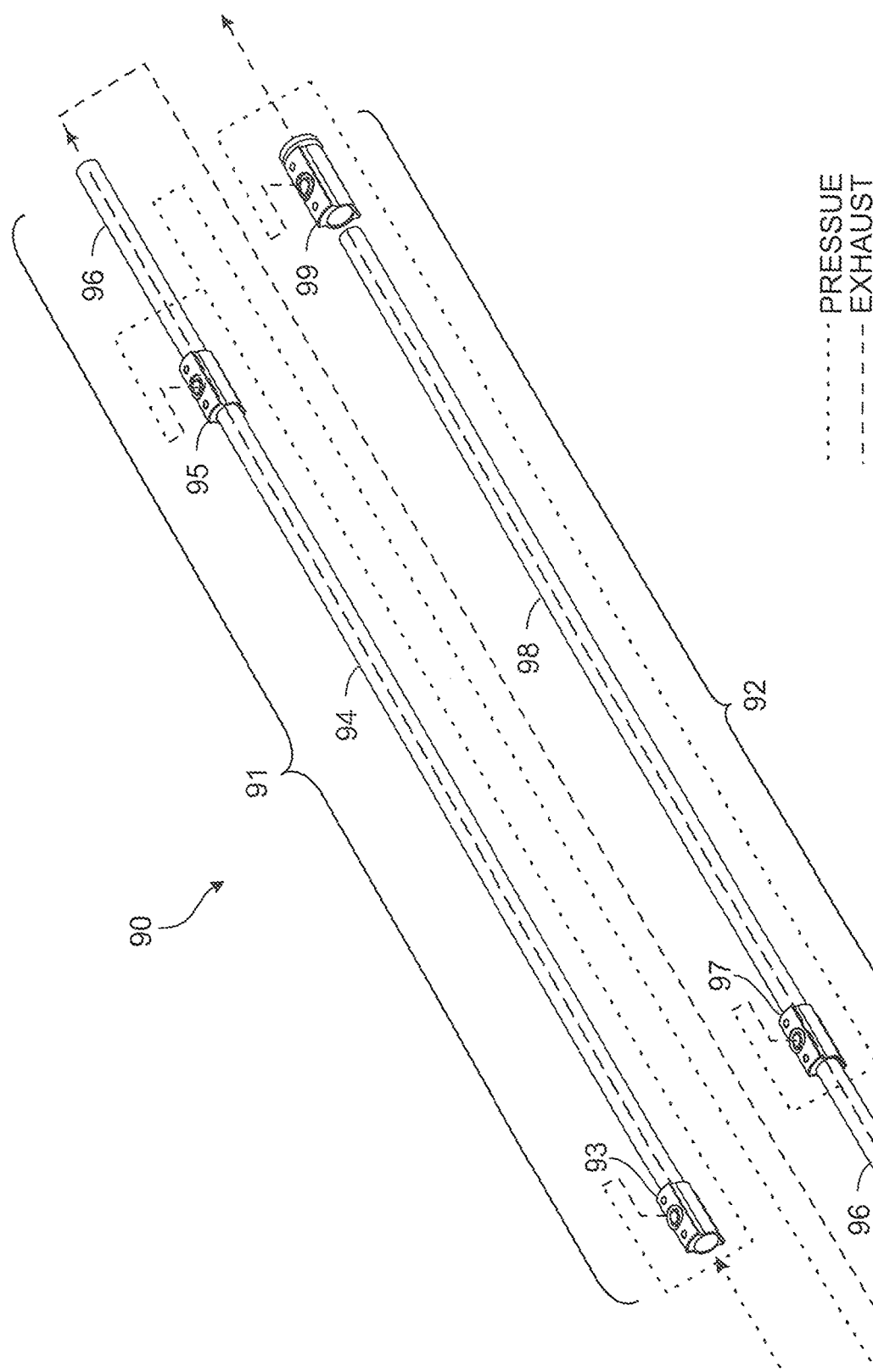
FIG. 10 illustrates working and power fluid flows through an axial piston motor module according to an embodiment of the disclosure.

FIG. 10 illustrates fluid flow paths through the motor 100 (FIG. 9). As discussed above, the fluid entering each module is separated into a working fluid flow that energizes the harmonic drive reciprocating ring assembly of that module and a pressure fluid flow that passes through the primary rotor shaft of that module and an exhaust flow that may have been collected from previous modules. The working fluid, after performing work, is exhausted from that module as an exhaust flow. The exhaust flow is then provided to downstream module(s) to continue to pass through the motor. The pressure fluid flow, after passing through a module, is provided to a downstream module to power the harmonic drive reciprocating ring assembly of that downstream module. Similarly, exhaust fluid flows from upstream modules must be isolated from pressure fluid flows that have yet to perform work until all exhaust fluid can be collected at the motor exit.

As can be seen in FIG. 10, an exhaust piping manifold 90 is assembled with subassembly 91 disposed within the first module 100*a* (see FIG. 10) and subassembly 92 disposed within the second module 100*b* (see FIG. 10) with the assemblies interconnected by exhaust tube 96. For the two-module motor under consideration, centralizer 93 is disposed within the first module and as such does not collect any exhaust flows from previous modules; it does allow pressurized fluid to the downstream module and accordingly has flutes cut in its periphery to allow pressurized fluid to flow by. Pressurized fluid is delivered to Chamber A of the first module, performs work, is collected as exhaust fluid at centralizer 93, and conveyed to exhaust tube 94 for pass through module 2. Pressurized fluid is delivered to Chamber B of the first module, performs work, is collected as exhaust fluid at centralizer 95, combined with flow from Chamber A and conveyed to exhaust tube 96 for pass through module 2. Centralizer 95 also includes flutes to allow pressurized fluid to flow by to module 2. Pressurized fluid is conveyed across these flutes within the primary rotor of module 1 and delivered to module 2. Pressurized fluid is delivered to the second module proximate centralizer 96, performs work, collected as exhaust fluid at centralizer 97 for Module 2 Chamber A and at centralizer 99 for Module 2 Chamber B, and combined with exhaust flow in exhaust tube 98 and allowed to exit the motor assembly. Comparable fluid management flow manifolds can be conceived for motors consisting of more than two modules with exhaust manifolds configured for each module according to the sequential connection of the assembly.

Figure 11:
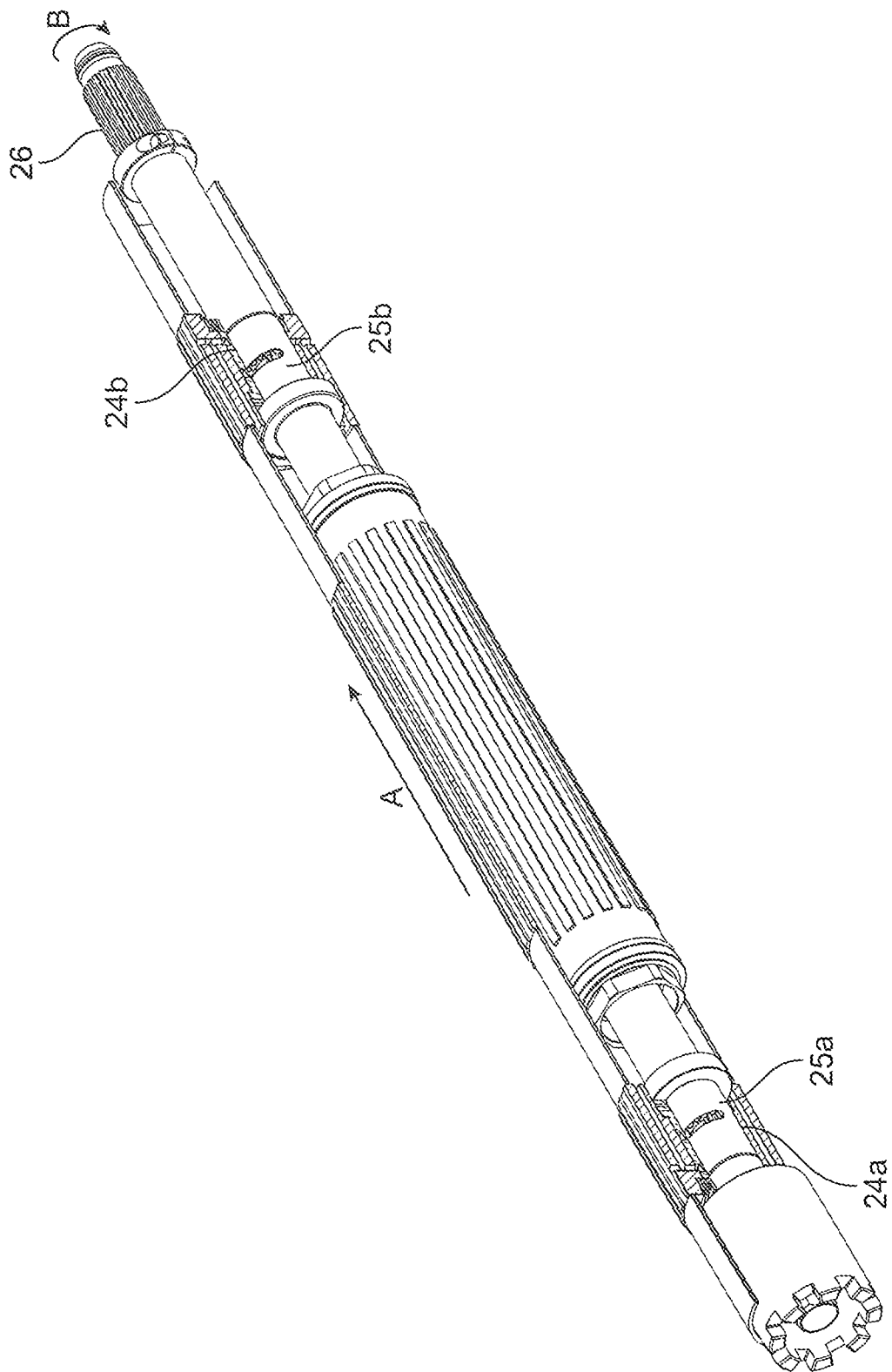
FIG. 11 is a partial cross section view of an axial piston motor module at commencement of a stroke according to an embodiment of the disclosure with liner assembly cutaway illustrating forward reciprocating piston motion.
Figure 12:
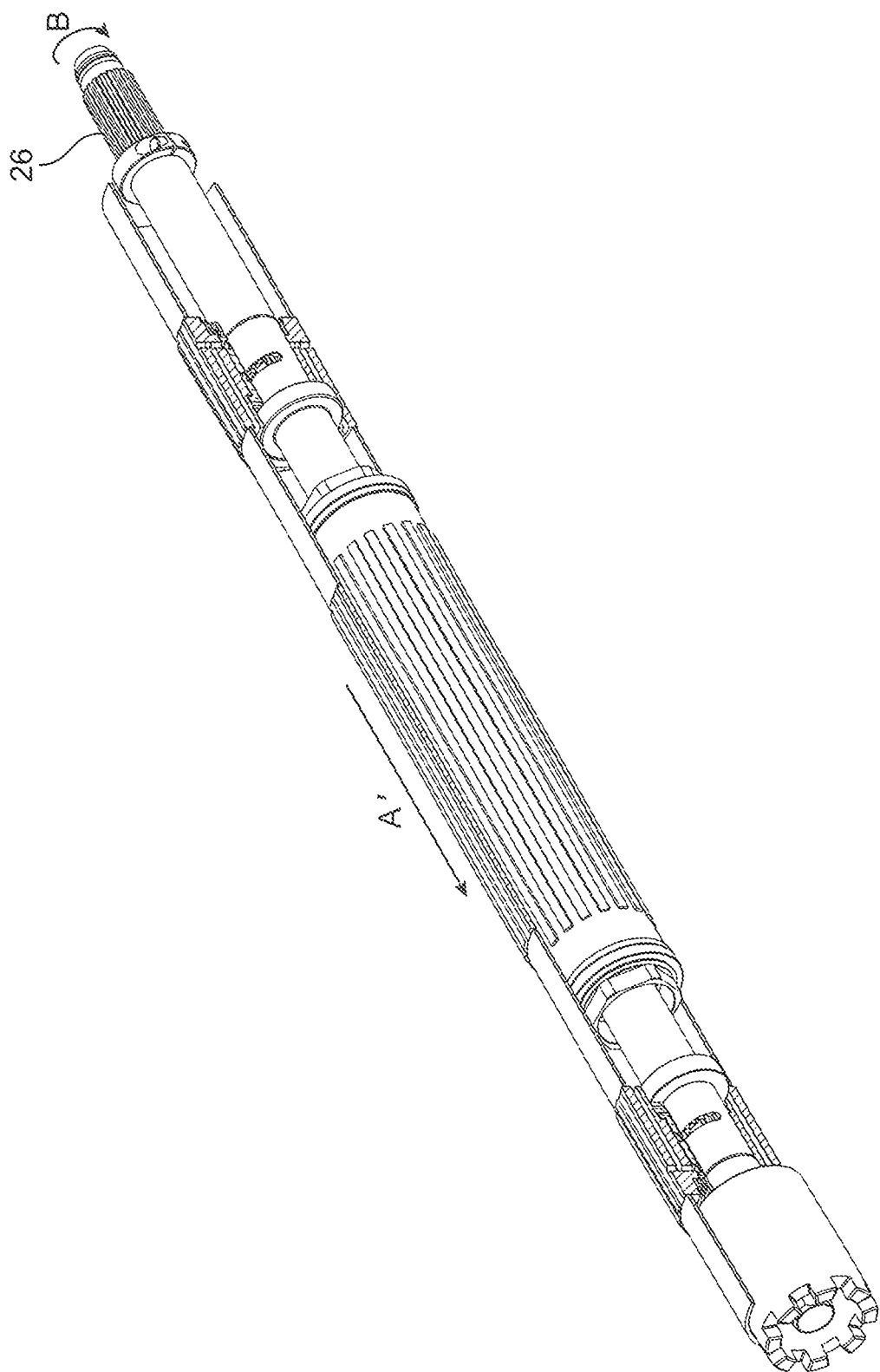
FIG. 12 is a partial cross section view of an axial piston motor module at completion of a stroke according to an embodiment of the disclosure with liner assembly cutaway illustrating backward reciprocating piston motion.

FIGS. 11 and 12 show the axial reciprocation of the harmonic drive reciprocating ring assembly and the corresponding rotor rotation. FIG. 11 is a partial cross section view of a motor module 10 at the commencement of a stroke according to an embodiment of the disclosure, with liner assembly cutaway illustrating right-ward reciprocating harmonic drive reciprocating ring assembly motion at commencement of stroke. As can be seen in FIG. 11, fluid is driving the harmonic drive reciprocating ring assembly 50 to the right in a direction that imparts forward linear motion A to the harmonic drive ring 50 (driving them in the direction indicated by A) such that the harmonic drive ring 50 imparts clockwise rotation B to the primary rotor assembly 26.

FIG. 12 is a partial cross section view of a motor module according to an embodiment of the disclosure with liner assembly cutaway illustrating left-ward reciprocating harmonic drive reciprocating ring assembly motion at completion of a stroke. As can be seen in FIG. 12, fluid is driving the harmonic drive reciprocating ring assembly 50 to the left in direction that imparts backward linear motion A' to the harmonic drive ring 50 such that the harmonic drive ring 50 imparts clockwise rotation B to the primary rotor assembly 26.

Operation

The operation of an axial piston motor is as follows. As the rotor rotates, the valves within the first valve block assembly open to allow fluid pressure and flow into chamber A of the axial piston assembly at the upstream end. The fluid pressure drives the axial pistons forward exhausting the fluid from chamber B at the downstream end. The exhaust fluid is directed to the exhaust ports in the lower valve block assembly. The exhaust valves allow flow from chamber B into the exhaust manifold on rotor centerline.

As the axial pistons move forward, the harmonic drive rings apply a force to the ball(s) in the reversing track of the harmonic drive and introduces clockwise rotation and torque to the output rotor.

As the axial pistons reach the end of stroke, the pressure and exhaust valves reverse port connections and the pressurized fluid is directed to chamber B and the fluid is exhausted from chamber A. This produces reverse motion in the axial pistons. Since the ball(s) in the harmonic drive had reached the dwell point at the end of the chamber A pressurization stroke, the ball(s) in the harmonic drive is now on the reversing track of the harmonic drive. As the harmonic drive rings retract during pressurization of chamber B, clockwise motion and torque are delivered to the output rotor. When the axial piston reaches the end of stroke, the harmonic drive(s) reaches another dwell point and the cycle is complete. The cycle repeats itself with the subsequent pressurization of chamber A and exhaust of chamber B as the rotor valves return to their initial conditions following one full or fractional rotation of the rotor.

Configurations

This paragraph describes the available configurations using the axial piston motor and the harmonic drive.

Figure 13C:
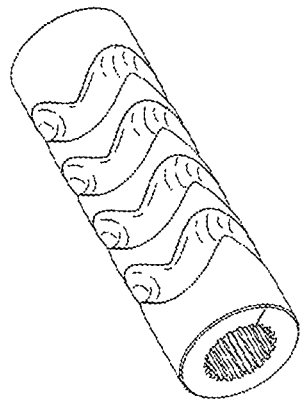
FIG. 13C is an illustration of a harmonic drive rotor according to an embodiment of the disclosure described herein using three cycles per revolution.
Figure 13B:
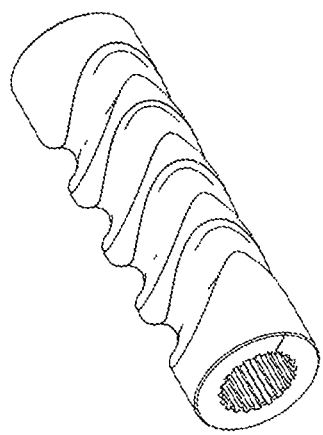
FIG. 13B is an illustration of a harmonic drive rotor according to an embodiment of the disclosure described herein using two cycles per revolution.
Figure 13A:
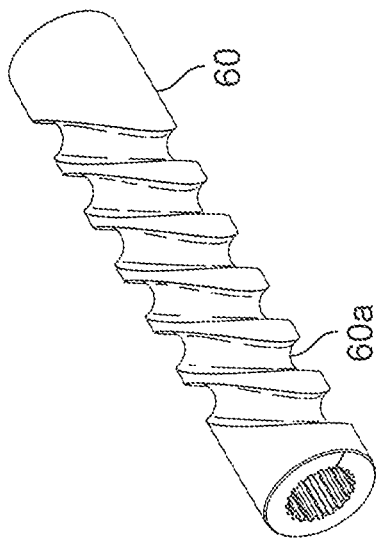
FIG. 13A is an illustration of a harmonic drive rotor according to an embodiment of the disclosure described herein using one cycle per revolution.

FIG. 13A is an illustration of a harmonic drive rotor 60 according to the present embodiment of the disclosure. As can be seen in FIG. 13A, the rotor track has one harmonic per revolution.

FIG. 13B is an illustration of a harmonic drive rotor 60 according to the present embodiment of the disclosure. As can be seen in FIG. 13B, the rotor track has two harmonics per revolution.

FIG. 13C is an illustration of a harmonic drive rotor 60 according to the present embodiment of the disclosure. As can be seen in FIG. 13C, the rotor track has three harmonics per revolution.

Figure 14C:
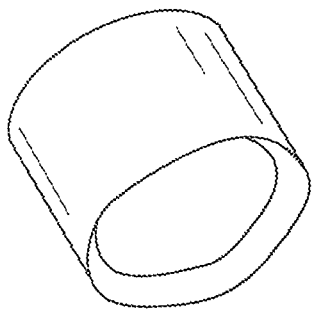
FIG. 14C is an illustration of a ball transfer outer race according to an embodiment of the disclosure using four cycles per revolution.
Figure 14B:
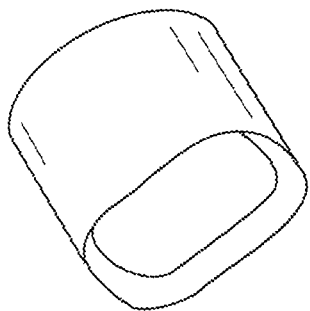
FIG. 14B is an illustration of a ball transfer outer race according to an embodiment of the disclosure using three cycles per revolution.
Figure 14A:
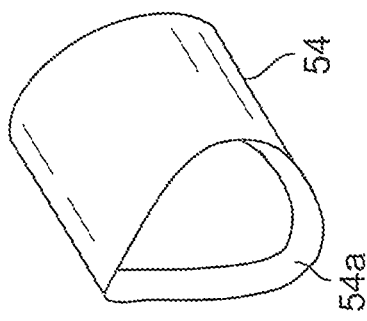
FIG. 14A is an illustration of a ball transfer outer race according to an embodiment of the disclosure using two cycles per revolution.

FIG. 14A is an illustration of a ball transfer outer race 53/54 according to an embodiment of the disclosure. As can be seen in FIG. 14A, the outer race has two harmonics per revolution, resulting in pi radians of ball advance along the ball orbit per harmonic drive reciprocating ring reciprocation cycle. The rotor will concurrently advance by a factor of (alpha+1) greater than the ball orbital advance in accordance with planetary drive train principles for rolling motion at the contact interfaces. Hence, the rotary displacement of the rotor can be tailored by selecting the dimensional properties of ball transfer outer race housing and matching harmonic drive rotor in accordance with the definition of alpha defined previously.

FIG. 14B is an illustration of a ball transfer outer race 53/54 according to another embodiment of the disclosure. As can be seen in FIG. 14B, the outer race has three harmonics per revolution, resulting in 2 pi/3 radians of ball advance along the ball orbit per harmonic drive reciprocating ring reciprocation cycle. The rotor will concurrently advance by a factor of (alpha+1) greater than the ball orbital advance. Hence, the rotary displacement of the rotor can be tailored by selecting the dimensional properties of ball transfer outer race housing and matching harmonic drive rotor in accordance with the definition of alpha defined previously.

FIG. 14C is an illustration of a ball transfer outer race 53/54 according to the present embodiment of the disclosure. As can be seen in FIG. 14C, the outer race has four harmonics per revolution, resulting in pi/2 radians of ball advance along the ball orbit per harmonic drive reciprocating ring reciprocation cycle. The rotor will advance concurrently by a factor of (alpha+1) greater than the ball orbital advance. Hence, the rotary displacement of the rotor can be tailored by selecting the dimensional properties of ball transfer outer race housing and matching harmonic drive rotor in accordance with the definition of alpha defined previously.

Comparing ring reciprocation (axial amplitude) of the harmonic drives in FIG. 13A-13C with reciprocating harmonic drive reciprocating piston/ring assemblies in FIGS. 14A-13C shows available design variation. For example, in accordance with the definition of alpha in FIG. 5: 1) the outer race of FIG. 14A can be matched with the harmonic drive rotor of FIG. 13A; 2) the outer race of FIG. 14B can be matched with the harmonic drive rotor of FIG. 13A or FIG. 13B; 3) the outer race of FIG. 14C can be matched with the harmonic drive rotor of FIG. 13A or FIG. 13B or FIG. 13C. Multiple configurations can be conceived by selecting the properties of the overall assembly components to achieve the desired rotor output speed and torque based upon input flow and pressure conditions.

Figure 15:
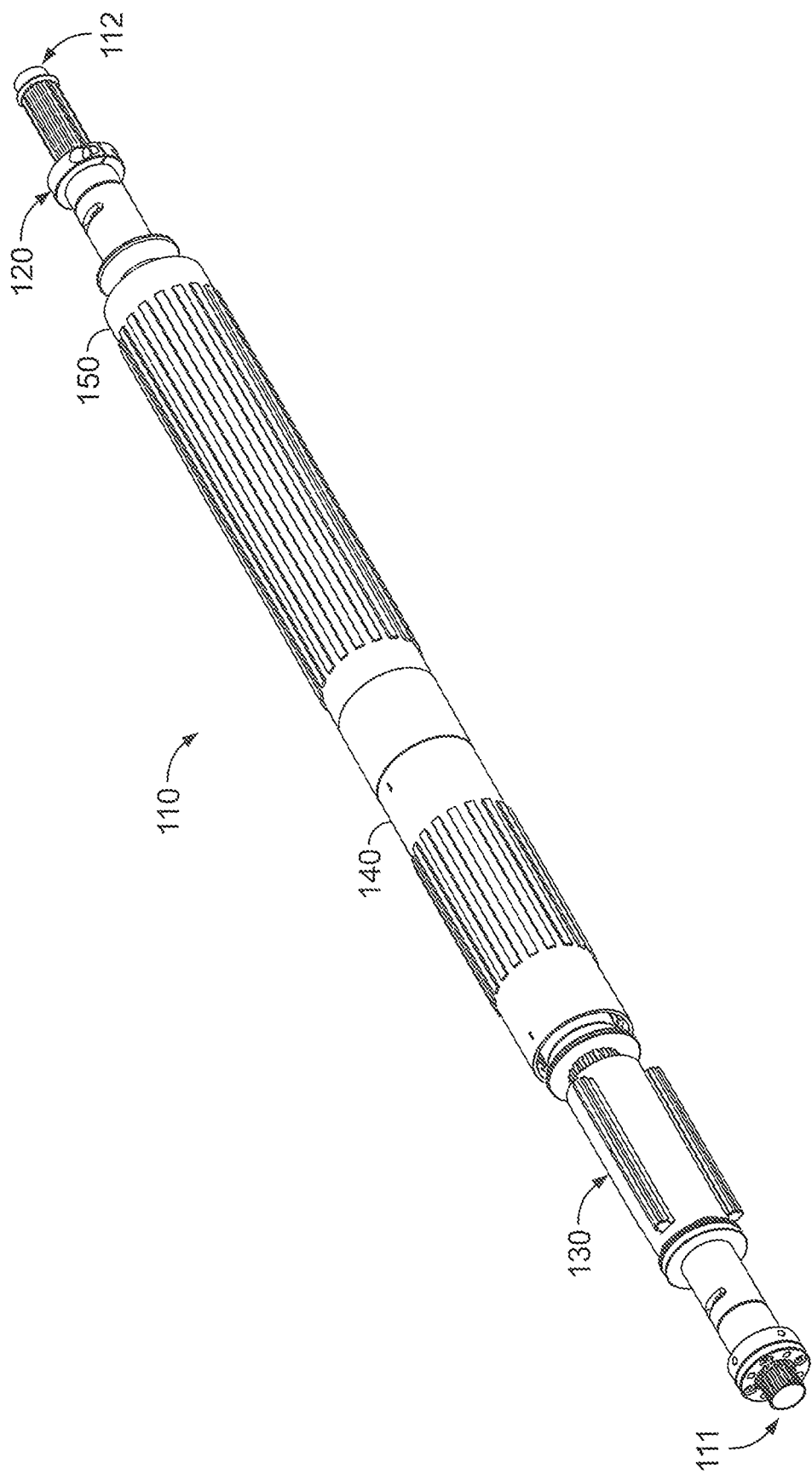
FIG. 15 illustrates a rotary piston internal power section portion of a fluid-powered linear motor module according to an embodiment of the disclosure.

FIG. 15 illustrates an internal power section of a fluid-powered linear motor module (internal power section) 110 according to an embodiment of the disclosure. The linear motor module or internal power section 110 may provide power to or be coupled to a tool or other component or other power section that uses or receives the generated rotary motion of the internal power section 110. As can be seen in FIG. 15, the internal power section 110 includes a primary rotor assembly 120, a secondary reciprocating rotor assembly 130, a helical drive reciprocating ring (helical drive ring) 140 and a harmonic drive reciprocating ring (harmonic drive ring) 150. Additional components not seen are discussed in further detail below. The internal power section 110 has aft end or fluid inlet 111 and a fore end or fluid outlet 112. The internal power section 110 receives fluid at the aft end that drives the secondary reciprocating rotor assembly that drives the helical and harmonic reciprocating rings to drive a harmonic drive rotor (described below) attached to the primary rotor assembly to impart a continual rotation thereto, the fluid discharged thereafter from the fluid outlet.

Figure 16:
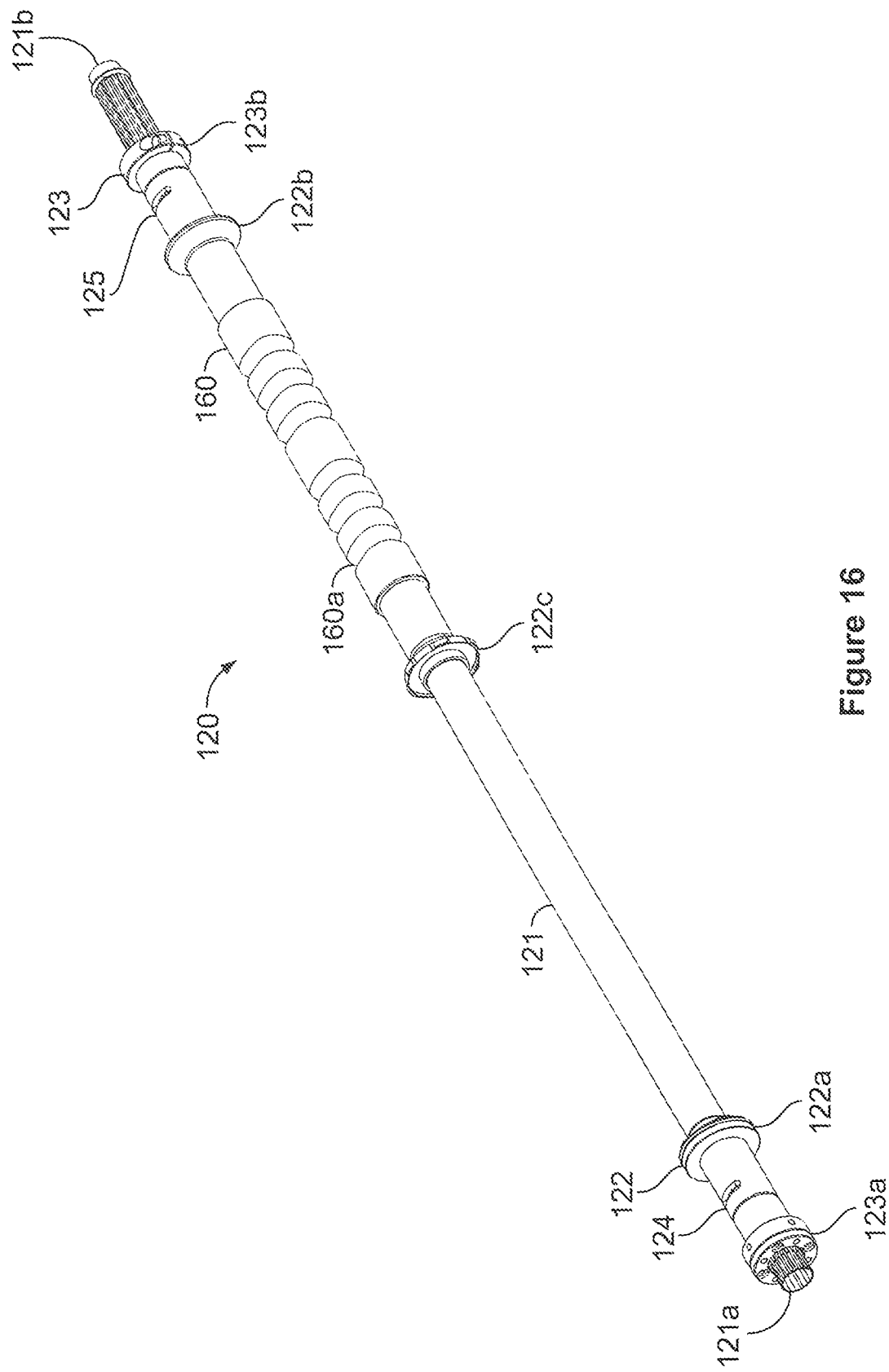
FIG. 16 illustrates a rotary piston primary rotor assembly and harmonic drive rotor disposed thereupon according to an embodiment of the disclosure

FIG. 16 illustrates a primary rotor assembly 120 and harmonic drive rotor 160 according to an embodiment of the disclosure. The primary rotor assembly 120 ports the fluid to the piston chambers as it rotates. The primary rotor assembly 120 produces torque in response to the harmonic drive ring 150 moving across the harmonic drive rotor 160. The primary rotor assembly 120 includes a primary rotor shaft 121, thrust bearing flanges 122, and end retainers 123. The primary rotor assembly 120 also includes a primary shaft fluid outlet (pressure) valve 124 and a primary shaft fluid inlet (exhaust) valve 125.

The thrust bearing flanges 122 react the force from the action of the harmonic drive reciprocating ring 150. There are three thrust bearing flanges 122, an aft thrust bearing flange 122a proximate the fluid inlet 121a, a forward thrust bearing flange 122b proximate the fluid outlet 121b, and a primary/secondary rotor bearing flange 122c proximate the middle of the shaft 121.

The end retainers 123 retain the various components comprising the subassembly on the primary rotor shaft. There are two end retainers 123, a first end retainer or locknut 123a disposed on the shaft 121 proximate the fluid inlet 121a and a second end retainer or shaft collar 123b disposed proximate the fluid outlet 121b.

The primary shaft fluid outlet valve 124 allows a portion of the fluid entering the shaft fluid inlet 121a and flowing through a shaft internal pressurized flow channel (not shown), which flows between the primary shaft fluid inlet 121a and the primary shaft fluid outlet 121b, to exit the shaft internal pressurized flow channel and drive the secondary reciprocating rotor assembly 130. The primary fluid inlet valve 125 allows the fluid that has driven the secondary reciprocating 130 to return to a shaft internal flow channel separate from the pressurized fluid flowing through the shaft internal pressurized flow channel. Both the pressurized fluid flowing through the shaft internal pressurized flow channel and the fluid that has performed work by driving the secondary reciprocating rotor assembly 130 are discharged as separate streams at the shaft fluid outlet 121b.

The harmonic drive rotor 160 is a cylindrical sleeve that has ball track grooves 160a that allow seating of ball transfers in harmonic drive reciprocating ring 150. The ball track grooves 160a form a recirculating path around the harmonic drive to convert harmonic, cycloidal or polynomial motion in the harmonic drive reciprocating ring 150 to rotary motion in the primary rotor assembly. The harmonic drive rotor 160 converts reciprocating motion in the harmonic drive reciprocating ring 150 to continuous rotary motion in primary rotor assembly 120. The harmonic drive rotor 160 is joined to, affixed or otherwise attached to the primary rotor assembly 120 so that imparting rotation to the harmonic drive rotor 160 imparts rotation to the primary rotor assembly 120.

Figure 17:
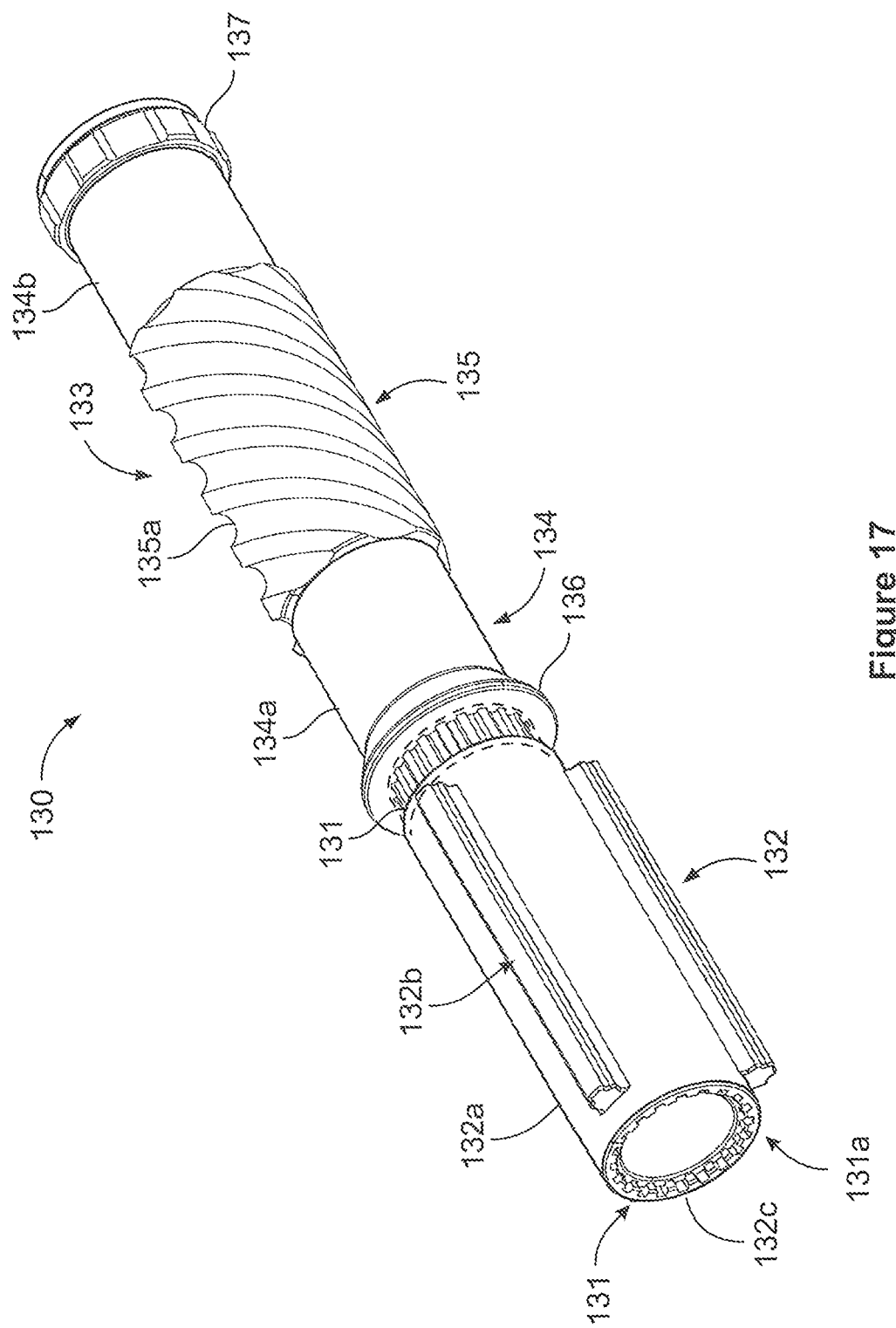
FIG. 17 illustrates a secondary rotor assembly according to an embodiment of the disclosure.

FIG. 17 illustrates a secondary reciprocating rotor assembly 130 according to an embodiment of the disclosure. The secondary reciprocating rotor assembly 130 is concentric to the primary rotor assembly 120 and can reciprocatedly rotate thereabout. The secondary reciprocating rotor assembly 130 includes a secondary reciprocating rotor (secondary rotor) 131, a reciprocating rotary piston assembly 132, and a helical drive screw assembly 133. The reciprocating rotary piston assembly 132 includes a housing 132a, reciprocating rotary motor blades or pistons 132b and splines 132c internal to the housing 132a. The reciprocating rotary piston assembly 132 shows an end view of the secondary rotor 132 so as to show secondary rotor splines 131a that engage with the splines 132c of the reciprocation rotary piston assembly 132.

The secondary rotor 131 is disposed concentrically around the primary rotor shaft 121 (see FIG. 14). As discussed above, the secondary rotor 131 includes secondary rotor splines 131a that engage with splines 132c internal to the reciprocating rotary piston assembly 132 and splines internal to the helical drive screw assembly 133 (not shown), so that reciprocating rotary motion imparted to the reciprocating rotary piston assembly 132 rotates the helical drive screw assembly 133 in a reciprocating manner as well.

The helical drive screw assembly 133 includes helical drive screw spacers (spacers) 134 on both sides of a helical drive screw 135. The spacers 134 include a fore drive screw spacer 134a and an aft drive screw spacer 134b. The spacers 134 have internal splines that couple the spacers 134 to the secondary rotor 131. The aft drive screw spacers 134a abuts against a bearing flange 136 coupled to the secondary rotor 131 via mating splines. The bearing flange 136 reacts thrust load from the helical drive reciprocating ring 140 to a thrust bearing 178e (see FIG. 22A). The fore drive screw spacer 134b is coupled to a flange 137. The bearing flange 137 reacts thrust load from the helical drive reciprocating ring 140 to the primary/secondary thrust bearing 122 (see FIG. 18).

The helical drive screw 135 is a cylindrical sleeve that has ball track grooves 135a that allow seating of ball transfers 145 (see FIGS. 19 and 19A) in helical drive reciprocating ring 140. The ball track grooves 135a form a non-recirculating path around the helical drive to convert reciprocating rotary motion in the secondary rotor assembly to reciprocating motion in the helical drive reciprocating ring 140.

Figure 18:
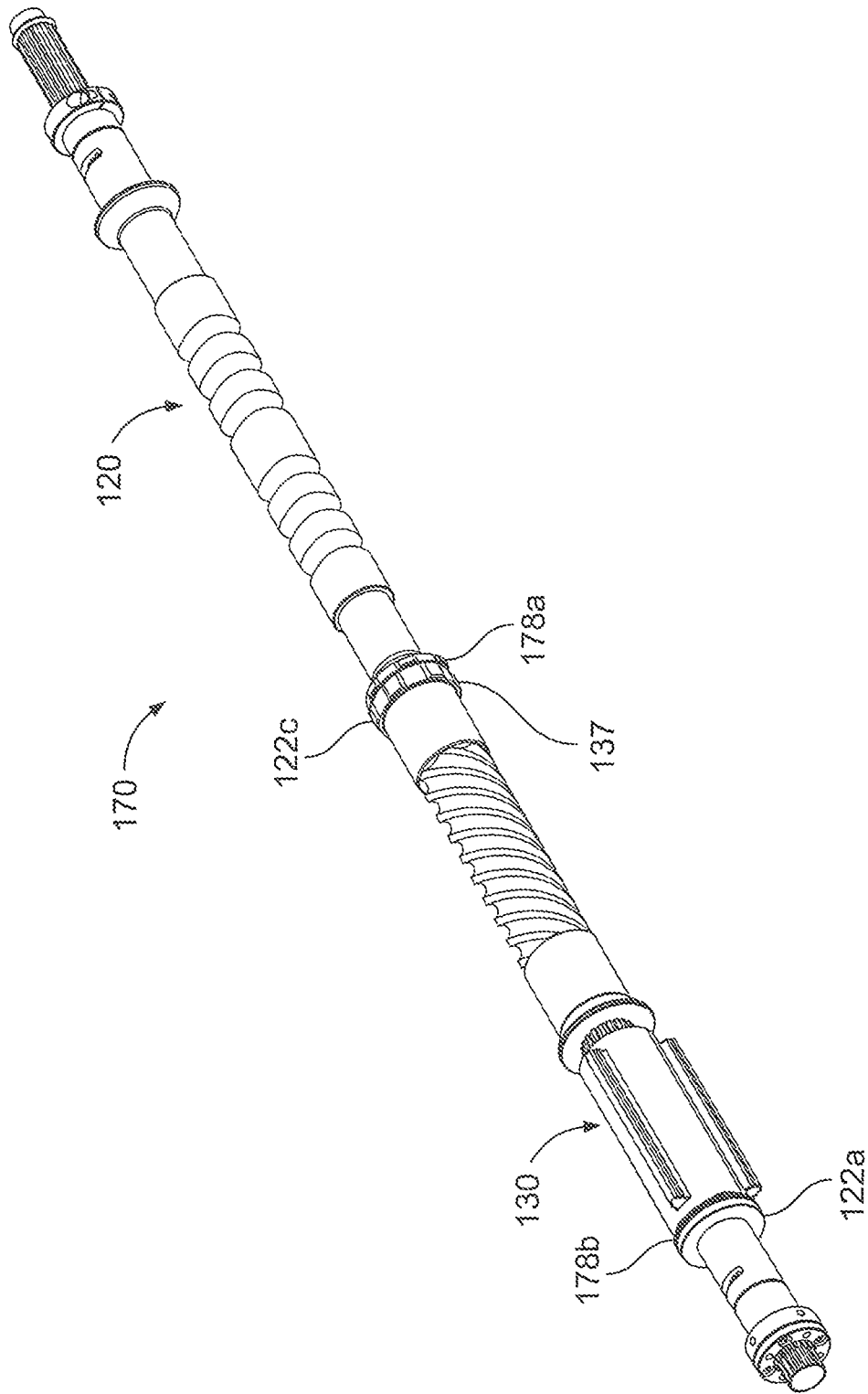
FIG. 18 illustrates a composite rotary assembly according to an embodiment of the disclosure.

FIG. 18 illustrates a composite rotary assembly 170 according to an embodiment of the disclosure. As can be seen in FIG. 18, the composite rotary assembly 170 is formed by concentrically assembling the secondary reciprocating rotor assembly 130 and the primary rotor assembly 120. The secondary reciprocating rotor assembly 130 is positioned longitudinally on the primary rotor assembly 120 by 1) abutting flange 137 on primary/secondary thrust bearing flange (flange) 122c with a thrust bearing 178a in the interstitial space between the flanges 122c and 137 at the interface between the secondary reciprocating rotor assembly 130 and the primary rotor assembly 120 and 2) abutting the reciprocating rotary piston assembly 130 against flange 122a with a thrust bearing 178b in the interstitial space between reciprocating rotary piston assembly 130. The helical drive ring 140 (see FIGS. 21 and 21B), the helical drive screw 135, the harmonic drive ring 150 (see FIGS. 21 and 21A), and the harmonic drive rotor 160 may be referred to as mechanical rectifier.

Figure 19:
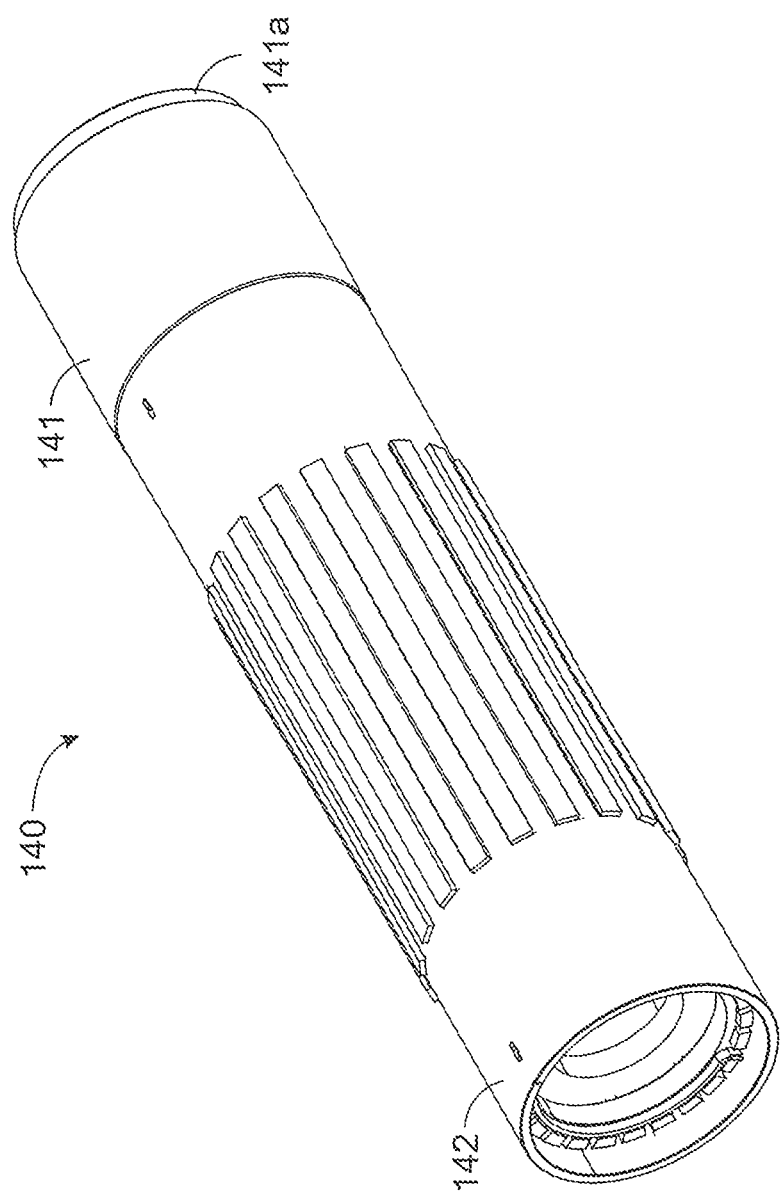
FIG. 19 illustrates a helical drive reciprocating ring and connecting flange according to an embodiment of the disclosure.
Figure 19A:
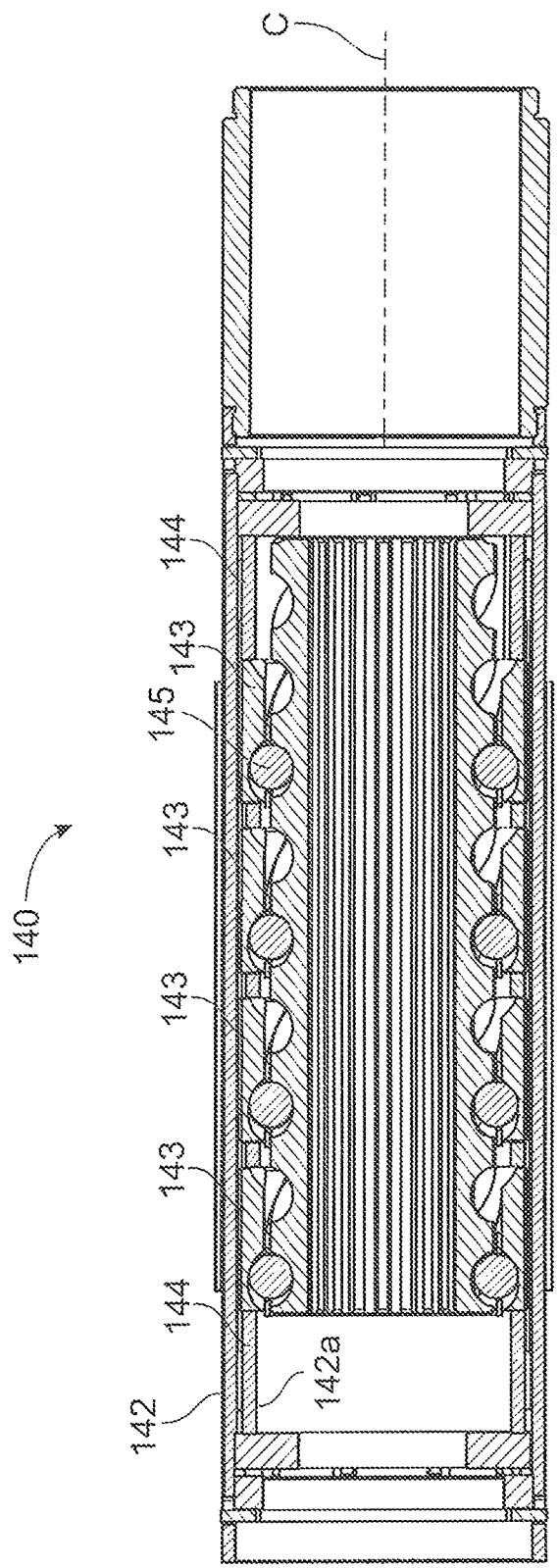
FIG. 19A is a longitudinal cross section view of the helical drive reciprocating ring and connecting flange of FIG. 19.

FIGS. 19 and 19A illustrate a helical drive reciprocating ring (helical drive ring) 140 and a connecting flange 141 according to an embodiment of the disclosure. As can be seen in FIGS. 19 and 19A, the helical drive ring 140 includes a housing 142 a plurality of inner ball transfer outer race housings 143 and an outer ball transfer race housing 144 that include a plurality of ball transfer outer races 143a and 144a and a plurality of track, roller balls (balls) 145 disposed within the plurality of ball transfer outer races 143a and 144a. The plurality of inner ball transfer outer race housings 143 and outer ball transfer race housings 144 may be referred to as the helical drive outer race. The plurality of ball transfer outer races 143a and 144a contain one or more balls 145 so that a portion of the balls extend towards the axial centerline of the housing 148 beyond the inner wall 142a of the housing 142 and the plurality of ball transfer outer race housings 143 and 144. Shims 147 are installed at assembly between the outer race housings to ensure dimensional fit between the outer race housings and helical drive rotor ball track grooves 135a (see FIG. 19A). The connecting flange 141 includes an insert portion 141a that is used to rigidly connect the helical drive ring 140 to the harmonic drive ring 150. The connecting flange 141 also includes an opposing insert portion (not shown) disposed within and rigidly connected to the helical drive ring 140.

The helical drive ring 140 is disposed around and concentric to the helical drive screw assembly 133 (FIGS. 15, 17, 18). The plurality of balls 145 engage and track in corresponding track grooves 135a of the helical drive screw 135 (FIGS. 15, 17, 18). In such a manner, the balls 145 and track grooves 135a are in load bearing contact and the balls 145 rotationally reciprocate in the ball transfer outer race retainer 144 as the helical drive screw 135 reciprocates.

Figure 20:
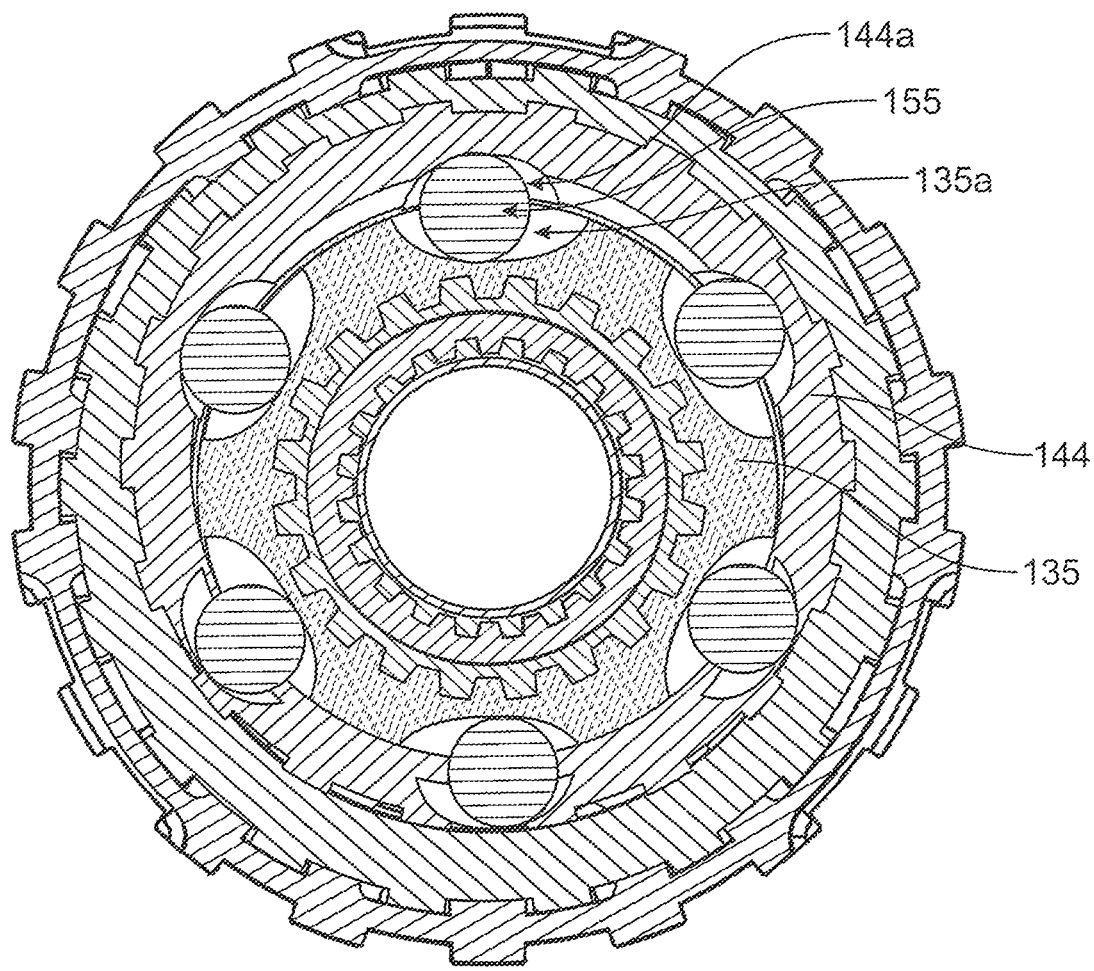
FIG. 20 is a lateral cross section view of the helical drive reciprocating ring of FIG. 19.

FIG. 20 is a lateral cross-sectional view through the helical drive ring illustrating the planetary drive train nature of the assembly comprising sun, planet, ring and carrier components corresponding to the helical drive rotor 135a, ball 155, outer race 154a, and ball orbit diameter 156 respectively of the earlier embodiment, which is the same functional relationship as in this embodiment. As the rotor (sun) rotates, the ball (planet) will reciprocatedly orbit the rotor (sun). In accordance with design convention, the diameters of these components must be dimensioned proportionally to ensure rolling motion at their contact points within the helical drive. "Alpha" values, governing the ratio of outer race diameter on the race retainer 144a to the inner race diameter on the helical drive rotor 135a must be observed for pure rolling motion at the contact points within the helical drive assembly.

Figure 21A:
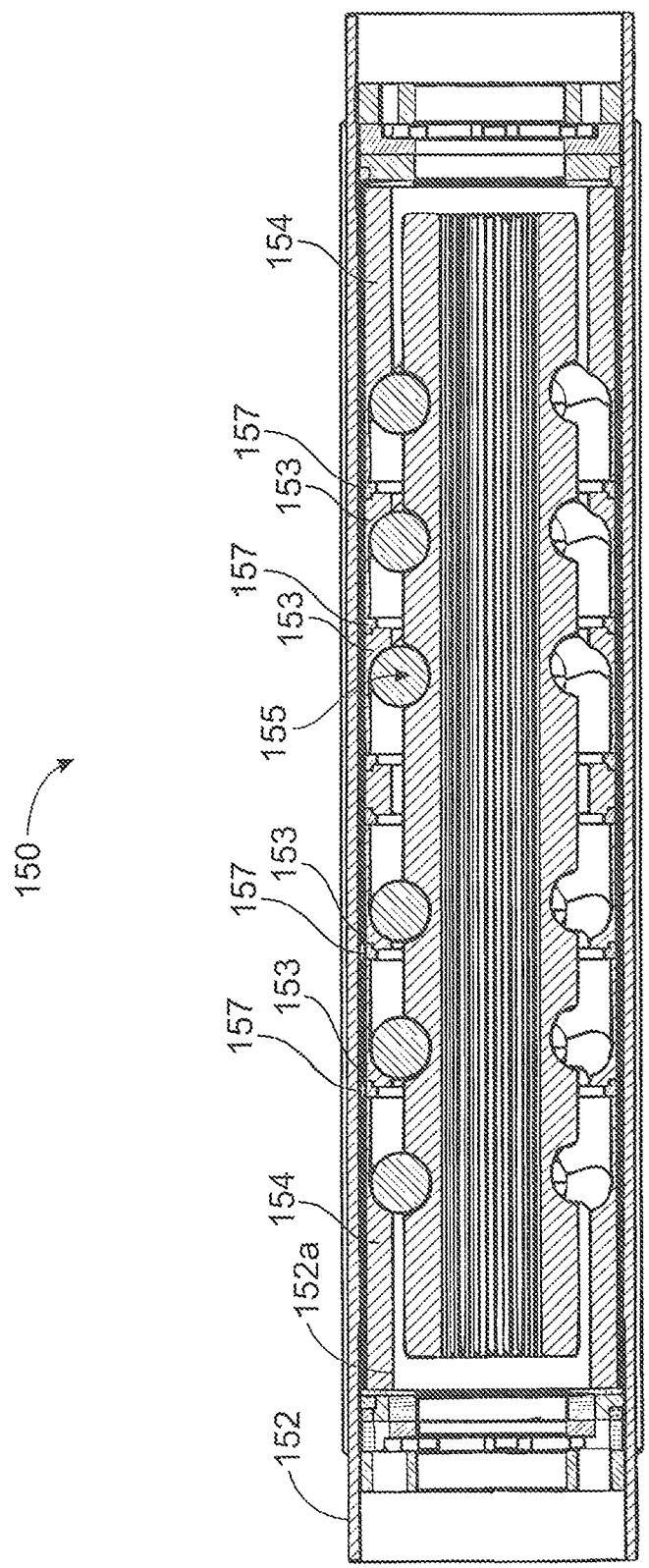
FIG. 21A is a longitudinal cross section view of the harmonic drive reciprocating ring of FIG. 21.

FIGS. 21 and 21A illustrate a [3:6] harmonic drive reciprocating ring (harmonic drive ring) 150 according to an embodiment of the disclosure. As can be seen in FIGS. 21 and 21A, the harmonic drive ring 150 includes a housing 152, a plurality of inner ball transfer outer race housings 153 and an outer ball transfer race housing 154 that include a plurality of ball transfer outer races 153a and 154a and a plurality of track, roller balls (balls) 155 disposed within the plurality of ball transfer outer races 153a and 154a. The plurality of inner ball transfer outer race housings 153 and outer ball transfer race housing 154 may be referred to as the harmonic drive outer race. The plurality of ball transfer outer races 153a and 154a contain one or more balls 155 so that a portion of the balls extend towards the axial centerline of the housing 152 beyond the inner wall 152a of the housing 152 and the plurality of ball transfer outer race housings 153 and 154. Shims 157 are installed at assembly between the outer race housings to ensure dimensional fit between the outer race housings and harmonic drive rotor ball track grooves 60a.

The harmonic drive ring 150 is disposed around and concentric to the harmonic drive rotor 160 (FIGS. 16, 18). The plurality of balls 155 engage and track in corresponding harmonic track grooves 160a of the harmonic track rotor 160 (FIGS. 16, 18). In such a manner, the balls 155 and harmonic track grooves 160a are in load bearing contact and the balls 155 rotate in the ball transfer outer race housings 154 as the harmonic drive rotor 160 rotates.

Figure 22:
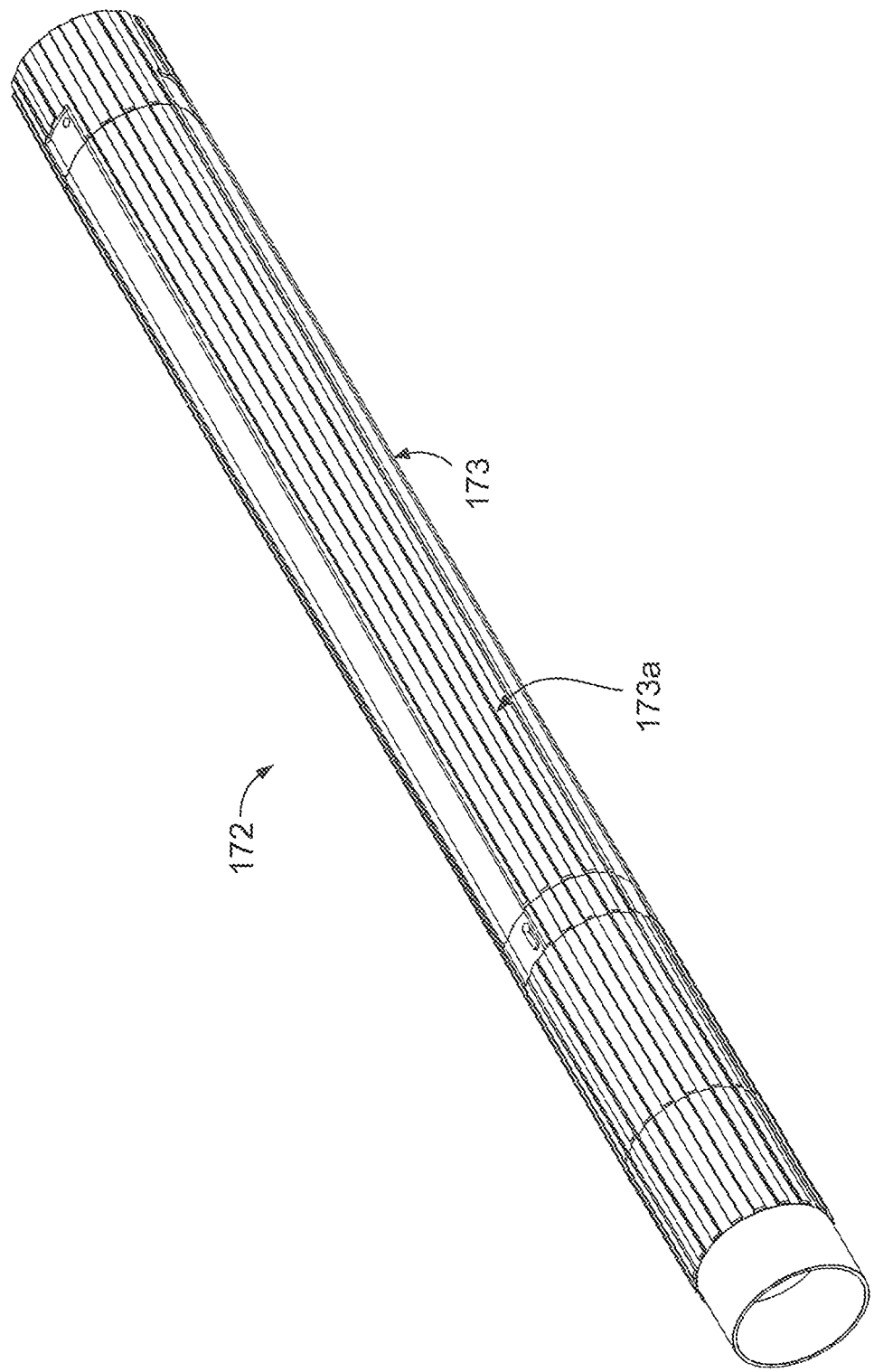
FIG. 22 illustrates a liner assembly according to an embodiment of the disclosure.
Figure 22A:
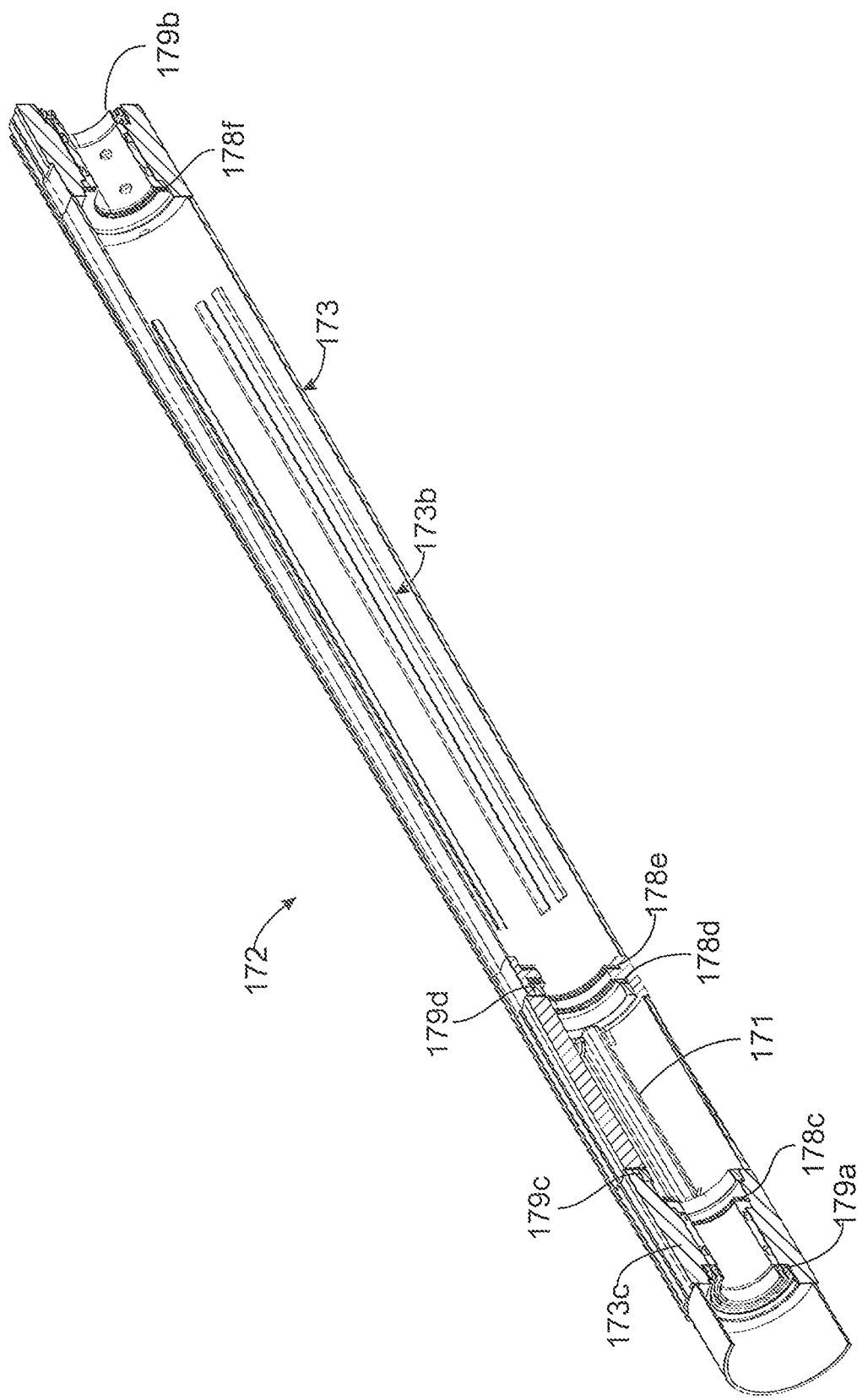
FIG. 22A is a cross section view of the liner assembly of FIG. 22

FIGS. 22 and 22A illustrates a liner assembly (liner) 172 according to an embodiment of the disclosure. In this exemplary disclosure the liner 172 is formed from multiple segments for ease of assembly of the motor module 180 (see FIG. 23). In other embodiments, the liner 172 may be formed of one or more components. The liner 172 acts as a stator and forms the interface between the motor case (shell) and the rotor assembly shown in FIG. 18. As can be seen in FIGS. 22 and 22A, the liner 172 includes a housing 173 having external splines 173a and internal splines 173b. The external splines 173a engage with the motor case or shell 201 (see FIG. 25) to prevent rotation of the liner 172 as the liner 172 reacts the torque from the reciprocating rings (140, 150) on the interior surface using internal splines 173b to prevent the rings 140, 150 from rotating. Thrust bearings 178c, 178d, 178e, 178f are shown installed within the liner in FIG. 22A and act to react rotor thrust loads during operation. Also shown in FIG. 22A are rotary bearings 179a & 179b that centralize the rotor assembly (FIG. 18) within the liner 172 and rotary bearings 179c & 179d that centralize the rotary piston 132 (FIG. 17) within the liner 172.

As can be seen in FIG. 22A, the liner 172 includes stator ribs 171 disposed there within. These stator ribs 171 interface with the rotary piston 132 to form cavities or chambers (e.g., chambers "A" & "B") that facilitate chamber pressurization in response to the following fluid pressurization sequence. As discussed in further detail below, adjacent rotary pistons 132 have a stator rib 171 disposed therebetween so as to divide the space therebetween into chambers "A" and "B." The internal components 173c include ports to receive fluid from the pressure valve 124 and convey the fluid to the chambers as described in further detail below. It should be noted that internal components 173 are shown solid at the cut away but contain ports internal thereto.

Figure 23:
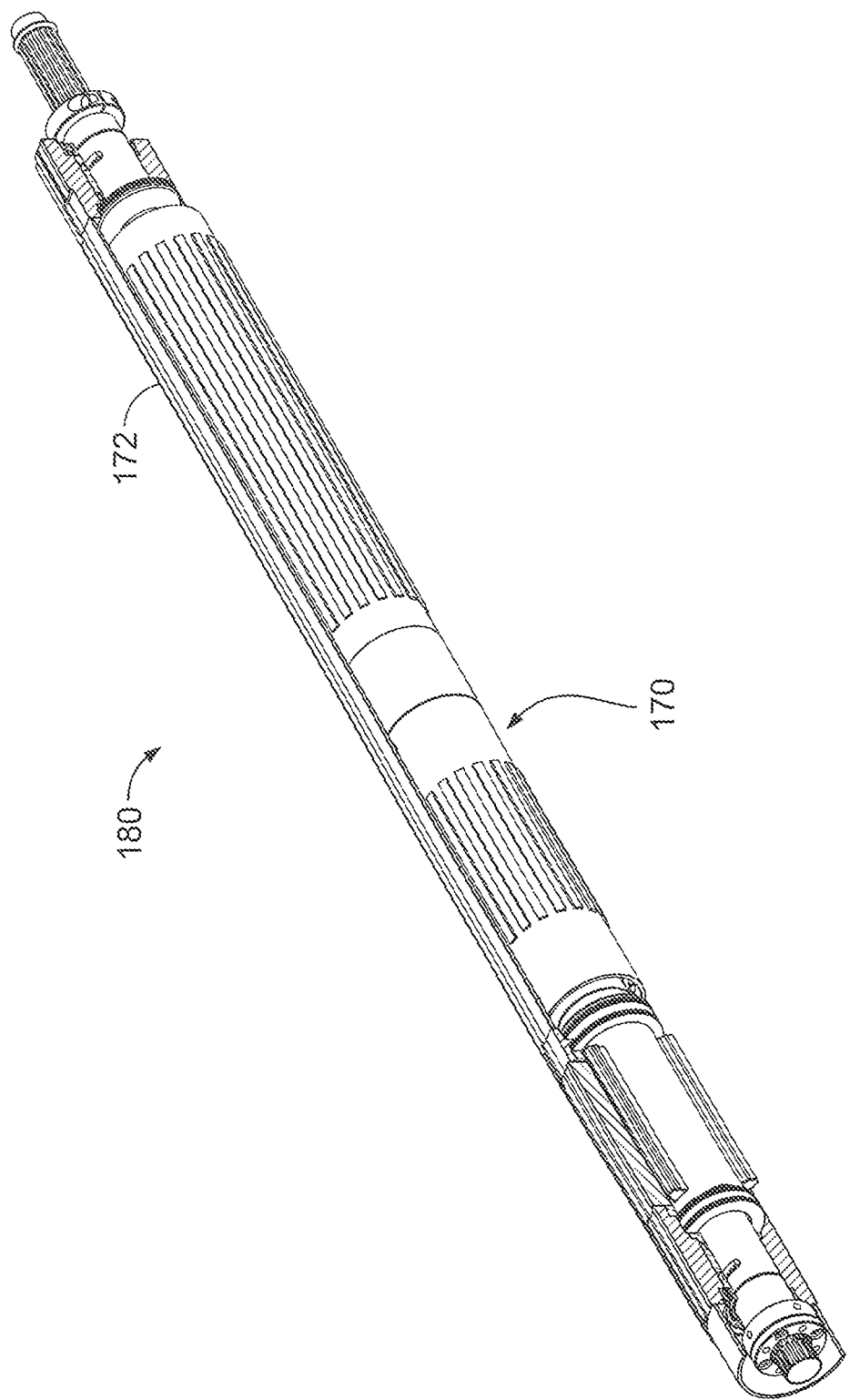
FIG. 23 is a partial cross section view of a rotary piston motor module according to an embodiment of the disclosure with liner assembly cutaway.

FIG. 23 is a partial cross section view of a motor module 180 according to an embodiment of the disclosure with the liner 172 cutaway. The rotor assembly 170 shown in FIG. 18 is shown installed in the cut-away of the liner 172a. The aforementioned thrust bearings 178c, 178d, 178e, 178f and rotary bearings 179a, 179b, 179c & 179d (shown in FIG. 22A) integrate the rotor assembly with the liner.

Figure 24:
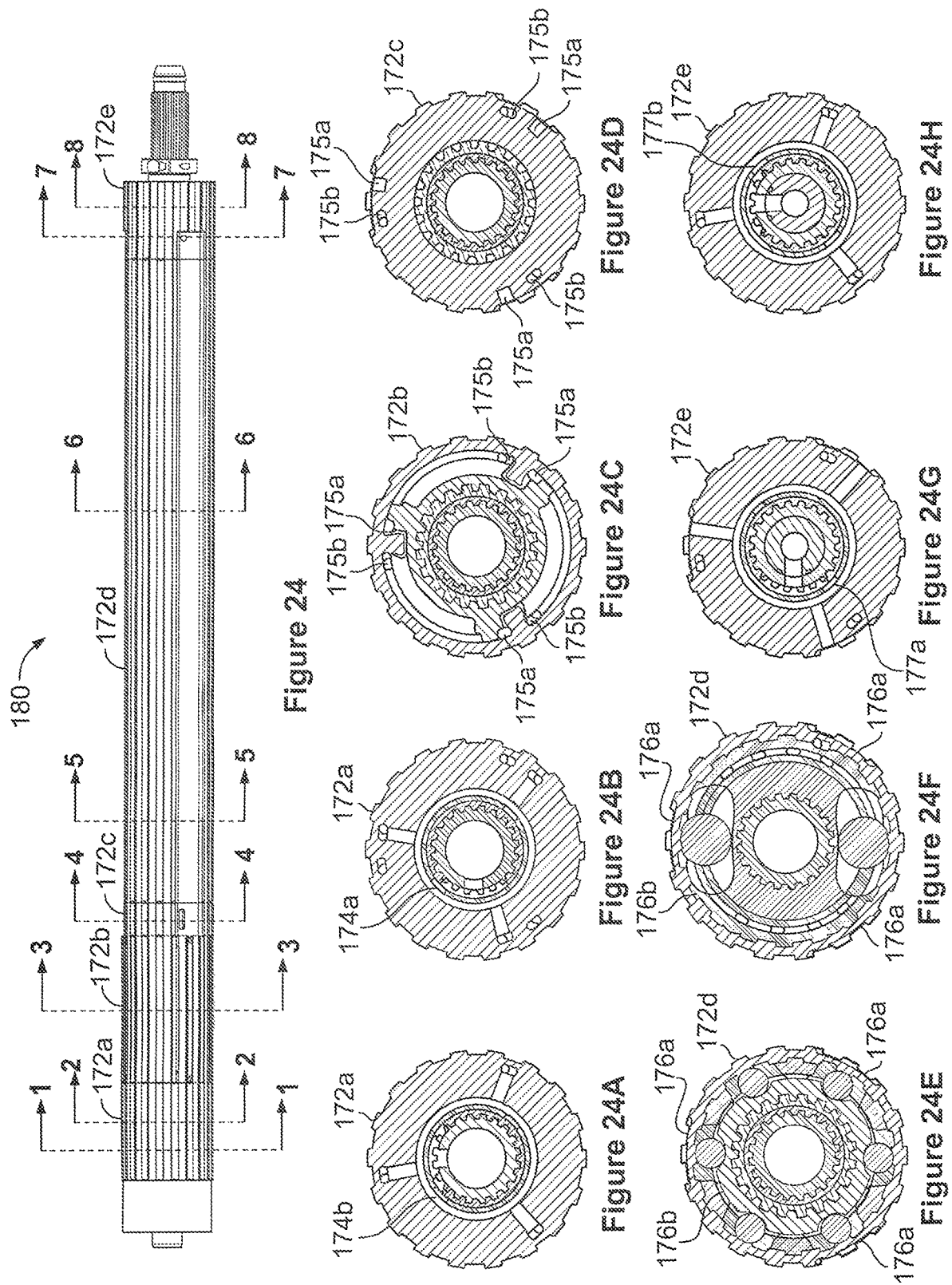
FIG. 24 is the motor module of FIG. 23 indicating cut-aways for FIGS. 24A-29H.

FIG. 24 shows the complete motor module 180 with sectional references for FIGS. 24A-24H indicated. As can be seen in FIGS. 24A-24H, the liner 172a further includes fluid injection ports 174 (fluid injection port 174a—Chamber A, fluid injection port 174b—Chamber B) into rotary piston stator 172b, a fluid relief port 175 (fluid relief port 175a—Chamber A, fluid relief port 175b—Chamber B) in liner 172c, a fluid channel 176 (fluid relief port 176a—Chamber A—external to liner 172d, fluid relief port 176b—Chamber B—internal to liner 172d) and a fore fluid inlet port 177 (fluid relief port 177a—Chamber A, fluid relief port 177b—Chamber B in liner 172e). These are described below using the various sections through the motor module 180 in FIG. 24.

FIGS. 24A-24H shows how alternatively pressurizing and exhausting Chambers A and B impart reciprocative rotary motion to motor pistons to generate rotation and torque in the output rotor. As discussed below, Chamber A is pressurized while Chamber B is concurrently exhausted to energize the rotor assembly to impart clockwise motion to the rotary pistons to generate clockwise motion in the output rotor, followed by alternatively porting Chamber B to pressurize while Chamber A is concurrently exhausted to energize the rotor assembly to impart counter-clockwise motion to the rotary pistons to generate clockwise motion in the output rotor.

The fluid injection ports 174 receive fluid from the primary shaft fluid outlet (pressure) valve 124 (see FIG. 24A section 1-1 and 24B section 2-2) and port it to the rotary piston Chambers A and B (see FIG. 24C section 3-3). Fluid injection port 174a connects rotor primary shaft fluid outlet valve 124a to rotary piston Chamber A via flow through the liner 172a; fluid injection port 174b connects rotor primary shaft fluid outlet valve 124b to rotary piston Chamber B via flow through the liner 172a. These fluid injection ports 174a & 174b connect alternatively during rotor rotation to pressurize the chambers for rotary piston reciprocation. (Note the referenced figures show the beginning of Chamber A pressurization and completion of Chamber B pressurization corresponding to clockwise rotation of the rotor assembly.)

The fluid relief port 175 receives fluid from the rotary piston chambers (see FIG. 29C section 3-3) for ejection to the rotor primary shaft fluid inlet (exhaust) valve 125 via fluid channel 176 and fore fluid port 177. Fluid injection port 175a (see FIG. 24D section 4-4) connects rotor primary shaft fluid outlet valve 125 to rotary piston Chamber A via fluid channel 176a (described below) and fore fluid port 177a (described below); fluid injection port 175b connects rotor primary shaft fluid outlet valve 125 to rotary piston Chamber B via fluid channel 176b (described below) and fore fluid port 177b (described below). These fluid ejection ports 175a & 175b connect alternatively during rotor rotation to exhaust the chambers for rotary piston reciprocation.

The fluid channel 176a receives fluid from the fluid relief port 175 for ejection to the rotor primary shaft fluid inlet (exhaust) valve 125 via fore fluid port 177. Fluid injection port 176a, one or more cavities in the exterior of liner 172d (see FIGS. 24E section 5-5 and 24D section 6-6) connects rotor primary shaft fluid outlet valve 125 to rotary piston Chamber A via fore fluid port 177a; fluid injection port 176b, flow across the helical drive reciprocating 140 (see FIG. 24E section 5-5) in the interior of liner 172d and harmonic drive reciprocating ring 150 (see FIG. 24F section 6-6) in the interior of liner 172d connects rotor primary shaft fluid outlet valve 125 to rotary piston chamber "B" via fore fluid port 177b. These fluid channels 176a & 176b connect alternatively during rotor rotation to exhaust the chambers for rotary piston reciprocation.

The fore fluid inlet port 177 receives fluid from the fluid channel 176 for ejection to the rotor primary shaft fluid inlet (exhaust) valve 125. Fore fluid inlet port 177a (see FIG. 24G section 7-7) connects rotor primary shaft fluid outlet valve 125 to rotary piston chamber "A" via fluid channel 176a and flow through the liner 172e; fore fluid inlet port 177b (see FIG. 24H section 8-8) connects rotor primary shaft fluid outlet valve 125 to rotary piston Chamber B via fluid channel 176b, fluid injection port 176b and flow through the liner 172e. These fore fluid inlet ports 177a & 177b connect alternatively during rotor rotation to exhaust the chambers for rotary piston reciprocation.

Figure 25:
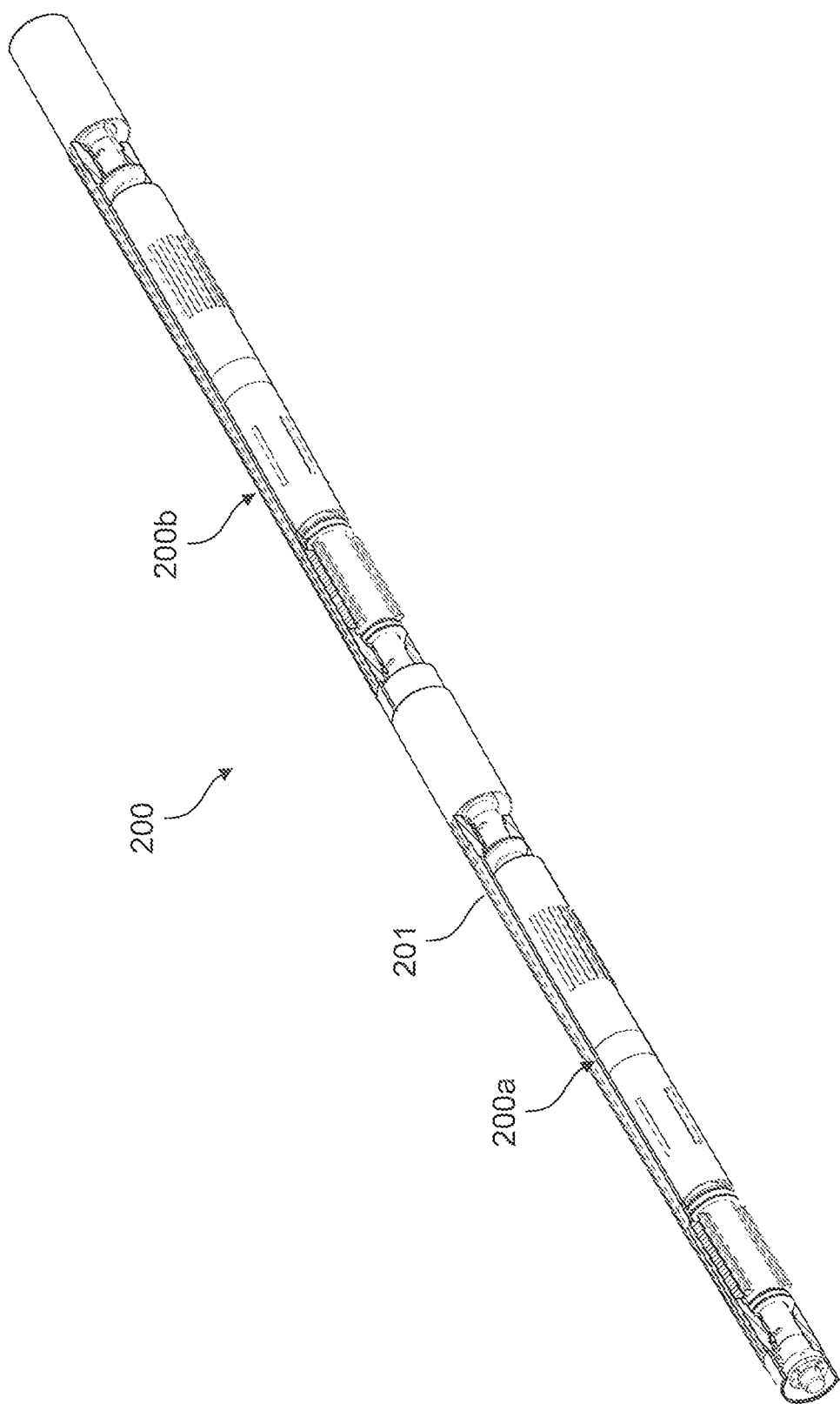
FIG. 25 illustrates a fluid-powered rotary piston linear motor according to an embodiment of the disclosure.

FIG. 25 illustrates a partial cut away view of a fluid-powered linear motor (motor) 200 according to an embodiment of the disclosure. As can be seen in FIG. 25, the motor 200 includes a first motor module 200a and a second motor module 200b. In other embodiments, a motor 200 may include two or more modules depending on the torque requirements of the application. The motor 200 requires the second motor module 200b to be assembled rotationally clocked from the first motor module 200a to provide a continuous output torque as the individual modules can then transition the respective dwell point or motion reversals of their piston reciprocation while the other module is providing rotor power. Additional modules can be added and similarly offset to allow continuous rotor torque during constituent module dwell points and provide increased torque delivery for the overall assembly.

Also shown in FIG. 25 is a case or shell 201 that accommodates installation of the constituent motor modules including a splined bore to receive liner assembly 172 and mate with housing 173 and external splines 173a. The shell 201 is secured (preloaded) with a connection (threaded or welded) to hold the motor in place.

It should be appreciated that the primary rotor shaft of the motor may be connected or coupled to a rotary tool or device, such as, but not limited to a rotary cutter or bit, via a rotating collar at the forward end of the shell. Likewise, the aft end of the shell may be connected to a drillstring such that the motor introduces rotary motion relative to the drillstring connection. In addition, the motor receives a fluid from a drillstring connection or other fluid supply source as may be appreciated by one of ordinary skill in the art.

Figure 26:
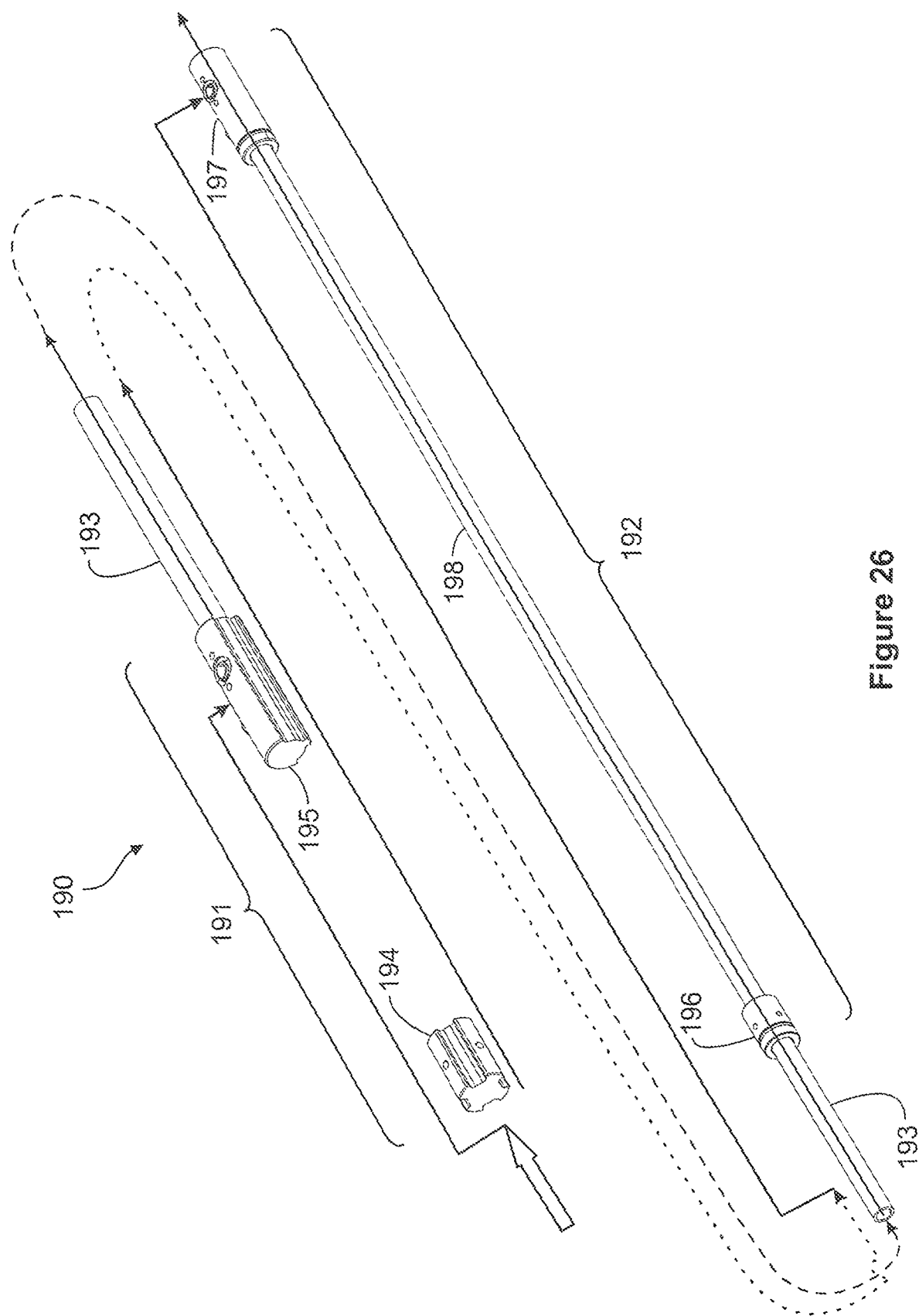
FIG. 26 illustrates working and power fluid flows through a motor module according to an embodiment of the disclosure.

FIG. 26 illustrates fluid flow paths through the motor 200 (FIG. 26). As discussed above, the fluid entering each module is separated into a working fluid flow that energizes the secondary reciprocating motor assembly of that module and a pressure fluid flow that passes through the primary rotor shaft of that module and an exhaust flow that may have been collected from previous modules. The working fluid, after performing work, is exhausted from that module as an exhaust flow. The exhaust flow is then provided to downstream module(s) to continue to pass through the motor. The pressure fluid flow, after passing through a module, is provided to a downstream module to power the secondary reciprocating motor assembly of that downstream module. Similarly, exhaust fluid flows from upstream modules must be isolated from pressure fluid flows that have yet to perform work until all exhaust fluid can be collected at the motor exit.

As can be seen in FIG. 26, an exhaust piping manifold 190 is assembled with subassembly 191 disposed within the first module 100a (see FIG. 25) and subassembly 192 disposed within the second module 100b (see FIG. 25) with the assemblies interconnected by exhaust tube 193. For the two-module motor under consideration, centralizer 194 is disposed within the first module and as such does not collect any exhaust flows from previous modules; it does allow pressurized fluid to the downstream module and accordingly has flutes cut in its periphery to allow pressurized fluid to flow by. Pressurized fluid is delivered to the first module, performs work, is collected as exhaust fluid at centralizer 195, and conveyed to exhaust tube 193 for pass through module 2. Centralizer 195 also includes flutes to allow pressurized fluid to flow by to module 2. Pressurized fluid is conveyed across these flutes within the primary rotor of module 1 and delivered to module 2. Pressurized fluid is delivered to the second module proximate centralizer 196, performs work, collected as exhaust fluid at centralizer 197, and combined with exhaust flow in exhaust tube 198 and allowed to exit the motor assembly. Comparable fluid management flow manifolds can be conceived for motors consisting of more than two modules with exhaust manifolds configured for each module according to the sequential connection of the assembly.

Figure 27:
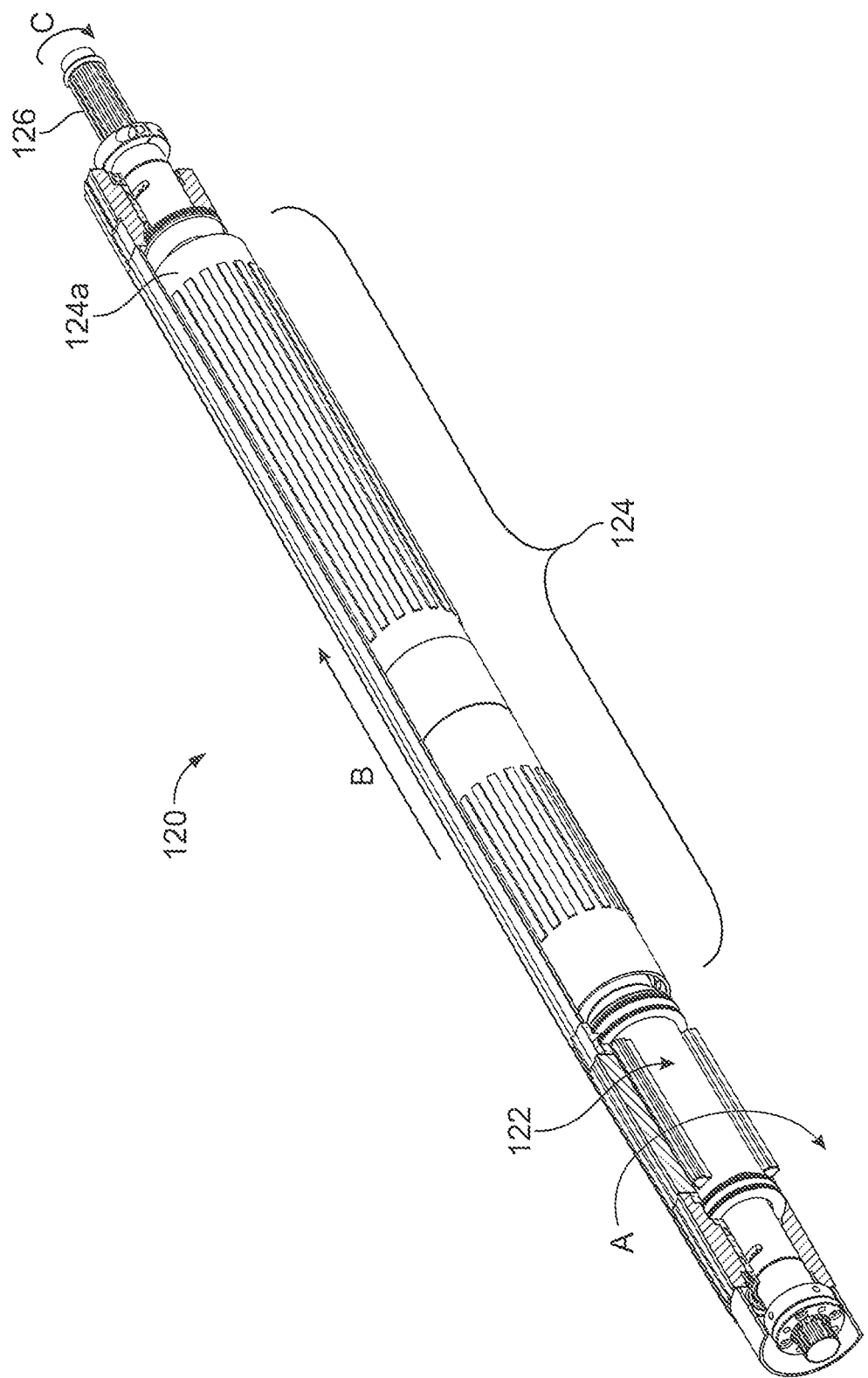
FIG. 27 is a partial cross section view of a motor module at commencement of a stroke according to an embodiment of the disclosure with liner assembly cutaway illustrating clockwise reciprocating rotor assembly rotation.
Figure 28:
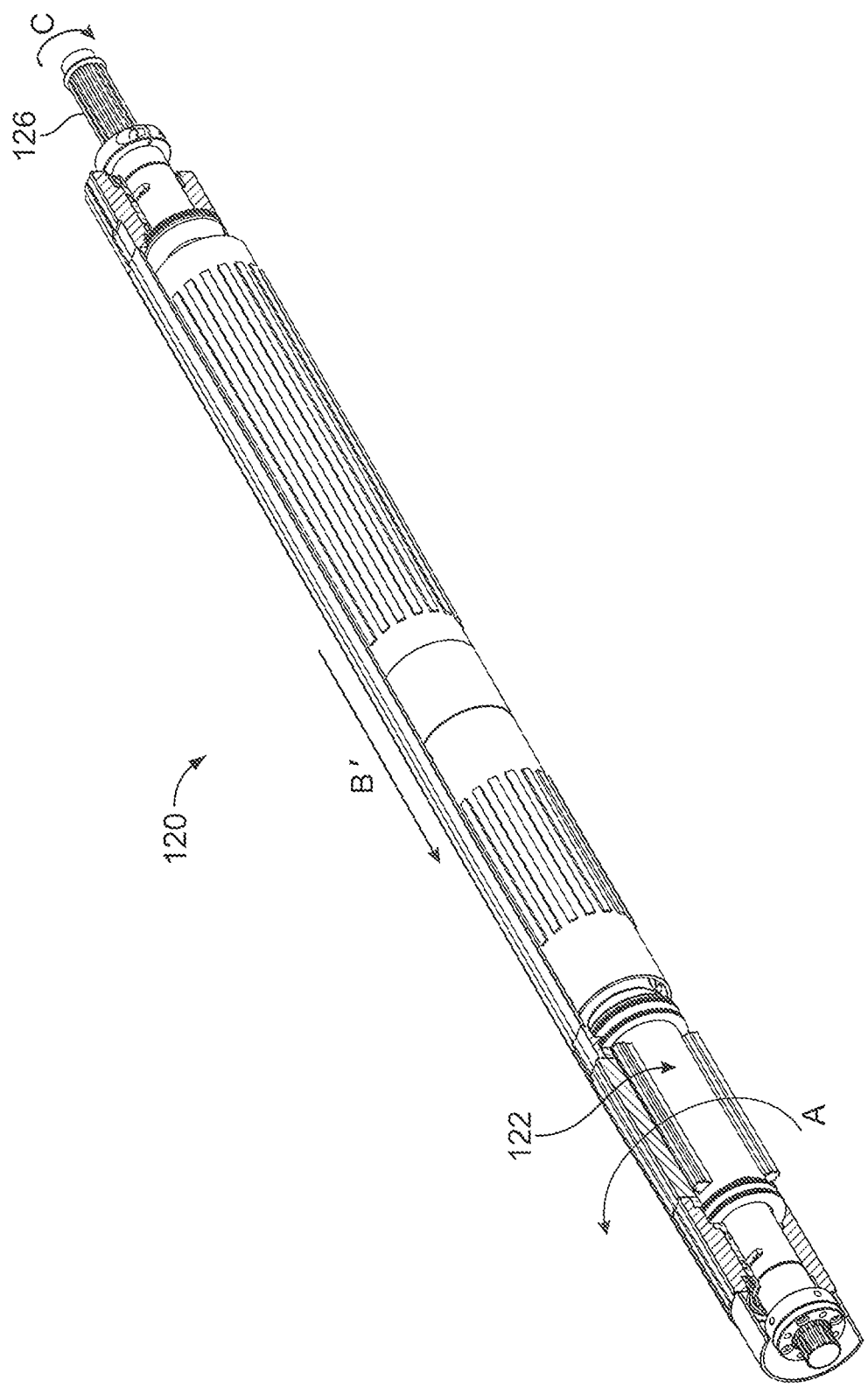
FIG. 28 is a partial cross section view of a motor module at completion of a stroke according to an embodiment of the disclosure with liner assembly cutaway illustrating counter-clockwise reciprocating rotor assembly rotation.

FIGS. 27 and 28 show the rotary reciprocation of the rotary piston assembly, related ring reciprocation, and the corresponding rotor rotation. FIG. 27 is a partial cross section view of a motor module 120 at the commencement of a stroke according to an embodiment of the disclosure, with liner assembly cutaway illustrating clockwise reciprocating rotor assembly rotation at commencement of stroke. As can be seen in FIG. 27, fluid is rotating the secondary reciprocating rotor assembly 122 in a clockwise direction A that imparts will forward linear motion B to the helical and harmonic drive rings 124 (driving them in the direction indicated by B) such that the harmonic drive ring 124a imparts clockwise rotation C to the primary rotor assembly 126.

FIG. 28 is a partial cross section view of a motor module according to an embodiment of the disclosure with liner assembly cutaway illustrating counter-clockwise reciprocating rotor assembly rotation at completion of a stroke. As can be seen in FIG. 28, fluid is rotating the secondary reciprocating rotor assembly 122 in a counter-clockwise direction A' that will impart a backward linear motion B' to the helical and harmonic drive rings 124 such that the harmonic drive ring 124a imparts clockwise rotation C to the primary rotor assembly 126.

Figure 29A:
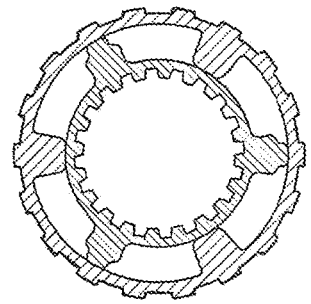
FIG. 29A is an illustration of a reciprocating rotary piston assembly and compatible stator with three rotary piston blades according to an embodiment of the disclosure.

FIG. 29A is an illustration of a reciprocating rotary piston assembly with a stator according to the present embodiment of the disclosure. As can be seen in FIG. 29A, a three-blade reciprocating rotary piston assembly is used with a three-ribbed stator.

Figure 29B:
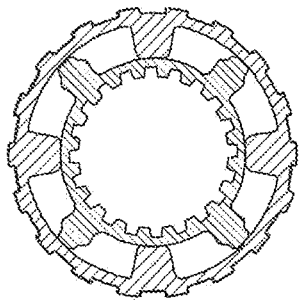
FIG. 29B is an illustration of a reciprocating rotary piston assembly and compatible stator with four rotary piston blades according to an embodiment of the disclosure.

FIG. 29B is an illustration of a four-blade reciprocating rotary piston assembly with a four-ribbed stator, resulting in 4/3 the output torque of the baseline embodiment in FIG. 29A for comparable pressure conditions. Hence, the rotor output torque can be increased by selecting the properties of the rotary piston assembly.

Figure 29C:
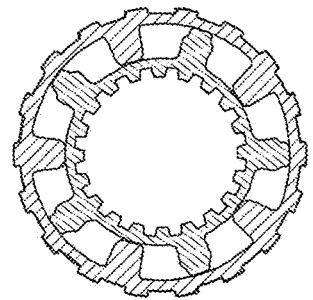
FIG. 29C is an illustration of a reciprocating rotary piston assembly and compatible stator with five rotary piston blades according to an embodiment of the disclosure.

FIG. 29C is an illustration of a five-blade reciprocating rotary piston assembly with a five-ribbed stator, resulting in 5/3 the output torque of the baseline embodiment in FIG. 29A for comparable pressure conditions. Hence, the rotor output torque can be increased by selecting the properties of the rotary piston assembly.

Comparing chamber volumes in FIGS. 29A, 29B & 29C, the cumulative chamber volume of each design decreases as additional stator ribs is used thereby decreasing the required fluid volume to complete reciprocation. Hence, the input flowrate characteristics of the motor can be modified by selecting the properties of the rotary piston assembly.

Figure 30A:
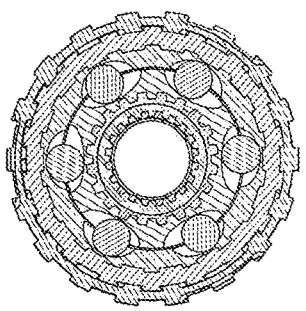
FIG. 30A is an illustration of a helical drive rotor according to another embodiment of the disclosure using large diameter balls.
Figure 30B:
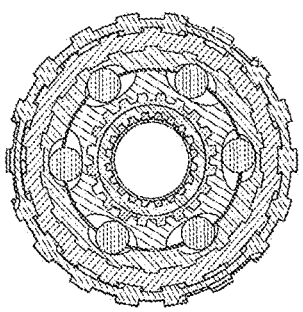
FIG. 30B is an illustration of a helical drive rotor according to another embodiment of the disclosure using nominal diameter balls.
Figure 30C:
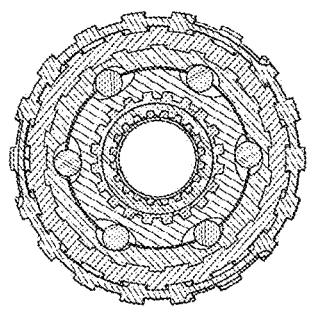
FIG. 30C is an illustration of a helical drive rotor according to another embodiment of the disclosure using small diameter balls.

FIGS. 30A, 30B and 30C, are illustrations of a helical drive assembly according to the present embodiment of the disclosure with large, nominal, and small balls, respectively, to accommodate varying circumferential strokes of the secondary rotor assembly and induced helical ring displacements.

Figure 31A:
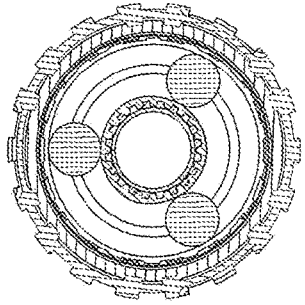
FIG. 31A is an illustration of a harmonic drive rotor according to an embodiment of the disclosure described herein using three cycles per revolution combined with a harmonic drive reciprocating ring with 6 harmonics per revolution.

FIG. 31A is an illustration of a harmonic drive assembly according to the present embodiment of the disclosure; the assembly is fitted with a rotor with three harmonics per revolution with a ball transfer outer race housing with six harmonics per revolution. The [3:6] configuration shown results in 180 degrees of rotor advance per ring reciprocation cycle making it preferred for rotary valve operation.

Figure 31B:
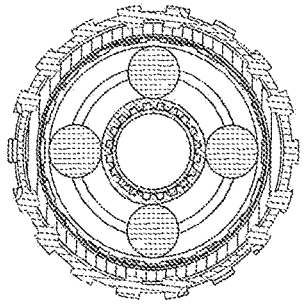
FIG. 31B is an illustration of a harmonic drive rotor according to another embodiment of the disclosure using four cycles per revolution combined with a harmonic drive reciprocating ring with 12 harmonics per revolution.

FIG. 31B is an illustration of a harmonic drive assembly according to the present embodiment of the disclosure; the assembly is fitted with a rotor with four harmonics per revolution with a ball transfer outer race housing with twelve harmonics per revolution. The [4:12] configuration shown results in 120 degrees of rotor advance per ring reciprocation cycle making it a preferred configuration for rotary valve operation.

Figure 31C:
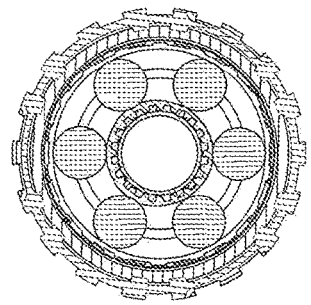
FIG. 31C is an illustration of a harmonic drive rotor according to another embodiment of the disclosure using six cycles per revolution combined with a harmonic drive reciprocating ring with 12 harmonics per revolution.

FIG. 31C is an illustration of a harmonic drive assembly according to the present embodiment of the disclosure; the assembly is fitted with a rotor with six harmonics per revolution with a ball transfer outer race housing with twelve harmonics per revolution. The [6:12] configuration shown results in 90 degrees of rotor advance per ring reciprocation cycle making it a preferred configuration for rotary valve operation.

Comparing ring reciprocation (axial amplitude) of various harmonic drives in FIGS. 31A, 31B & 31C with reciprocating rotary piston assemblies (circumferential reciprocation) in FIGS. 29A, 29B & 29C requires displacement compatibility via preferred selection of helical power screw properties that convert rotary piston reciprocation into axial ring displacement. Multiple configurations can be conceived by selecting the properties of the overall assembly components to achieve the desired rotor output speed and torque based upon input flow and pressure conditions. Other configurations may be realized by appropriate selection of design parameters.

Operation

The operation of a rotary piston motor is as follows. As the rotor rotates, the valves within the first valve block assembly open to allow fluid pressure and flow into chamber A of the rotary piston assembly at the upstream end. The fluid pressure drives the rotary pistons clockwise exhausting the fluid from chamber B at the downstream end. The exhaust fluid is ported around the harmonic drive assembly and directed to the exhaust ports in the lower valve block assembly. The exhaust valves allow flow from chamber B into the exhaust manifold on rotor centerline.

As the rotary pistons rotate clockwise, an output torque is delivered to the helical drive screw assembly. This clockwise rotation and torque produces ball motion in the non-reversing track and produces forward axial motion in the helical and harmonic drive rings. The helical and harmonic drive rings apply a force to the ball(s) in the reversing track of the harmonic drive and introduces clockwise rotation and torque to the output rotor.

As the rotary pistons reach the end of stroke, the pressure and exhaust valves reverse port connections and the pressurized fluid is directed to chamber B and the fluid is exhausted from chamber A. This produces counter-clockwise motion in the rotary piston output shaft and reverses the motion of the ball(s) in the helical drive screw and causes the helical and harmonic drive rings to retract. Since the ball(s) in the harmonic drive had reached the dwell point at the end of the chamber A pressurization stroke, the ball(s) in the harmonic drive is now on the reversing track of the harmonic drive. As the helical and harmonic drive rings retract during pressurization of chamber B, clockwise motion and torque are delivered to the output rotor. When the rotary piston reaches the end of stroke, the harmonic drive(s) reaches another dwell point and the cycle is complete. The cycle repeats itself with the subsequent pressurization of chamber A and exhaust of chamber B as the rotor valves return to their initial conditions following one full or fractional rotation of the rotor.

Configurations

The harmonic drive rotor includes a specified number of harmonics. The number of harmonics on the output shaft is coupled with the number of blades on the rotary piston so that the speed output of the assembly is commensurate with the rotation-generating capacity of the rotary piston assembly. That is, as the number of harmonics on the assembly increases, the rotor advance per piston cycle will decrease; this will decrease the speed of the rotor for a given flowrate through the motor. Accordingly, the number of blades on the rotary piston can likewise increase to provide increased torque at lower speeds so that the motor can run at constant rotational power with the output torque and speed tailored to preferred values. Some of the options are shown by combining the rotary piston, helical drive and harmonic drive options in the panel of FIGS. 29, 30 & 31.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

The invention claimed is:

1. A rotary motor module, comprising:
a primary rotor assembly comprising a harmonic drive rotor, the harmonic drive rotor comprising two or more ball track grooves;
a secondary reciprocating rotor assembly coupled to the primary rotor assembly, the secondary reciprocating rotor assembly comprising a reciprocating rotary piston assembly and a helical drive screw;
a helical drive reciprocating ring coupled to the helical drive screw; and
a harmonic drive reciprocating ring coupled to the helical drive reciprocating ring and the harmonic drive rotor, the harmonic drive reciprocating ring comprising two or more ball transfer outer race housings that define ball transfer outer races;
at least one ball disposed within each of the ball track grooves and the ball transfer outer races;
wherein the ball track grooves form a recirculating path around the harmonic drive to convert harmonic, cycloidal or polynomial motion in the harmonic drive reciprocating ring to rotary motion; and
wherein the harmonic drive reciprocating ring is coupled to the helical drive reciprocating ring and the harmonic drive rotor so that reciprocating motion of the secondary reciprocating rotor assembly imparts linear motion to the helical and harmonic reciprocating rings so that the harmonic reciprocating ring rotates the helical drive screw to impart continuous rotary motion to the primary rotor assembly.

2. The rotary motor module of claim 1, wherein the harmonic drive reciprocating ring is matched to torque capacity and displacement response of the rotary piston and helical drive assemblies.

3. The rotary motor module of claim 1, wherein the helical drive reciprocating ring is coupled to the helical drive reciprocating rotor to provide rolling motion at contact points with the balls in conformance with planetary drive design principles.

4. The rotary motor module of claim 1, wherein the helical drive reciprocating ring comprises ball transfers that couple the helical drive reciprocating ring to the helical drive screw.

5. The rotary motor module of claim 1, wherein the helical drive reciprocating ring comprises two or more ball transfer outer race housings that define ball transfer outer races.

6. The rotary motor module of claim 1, wherein the primary rotary assembly further comprises a reciprocating rotary piston assembly comprising two or more motor pistons.

7. The rotary motor module of claim 1, wherein the harmonic drive reciprocating ring comprises ball transfers that couple the harmonic drive reciprocating ring to the harmonic drive rotor.

8. The rotary motor module of claim 1, wherein the helical ring is rigidly coupled to the harmonic drive ring.

9. The rotary motor module of claim 1, wherein the primary rotor assembly further comprises a primary rotor shaft comprising a fluid inlet and a fluid outlet for receiving and discharging the fluid.

10. The rotary motor module of claim 1, further comprising a liner assembly disposed around the motor module for porting the fluid to and from the secondary reciprocating rotor assembly.

11. The rotary motor module of claim 10, wherein the liner assembly comprises two or more stator ribs that with rotary pistons of the reciprocating rotary piston assembly partially define fluid chambers that receive fluid to drive the reciprocating rotary piston assembly.

12. A rotary motor comprising:
two or more motor modules, wherein at least one of the two or more motor modules comprises:
a primary rotor assembly comprising a harmonic drive rotor, the harmonic drive rotor comprising two or more ball track grooves;
a secondary reciprocating rotor assembly coupled to the primary rotor assembly, the secondary reciprocating rotor assembly comprising a reciprocating rotary piston assembly and a helical drive screw;
a helical drive reciprocating ring coupled to the helical drive screw; and
a harmonic drive reciprocating ring coupled to the helical drive reciprocating ring and the harmonic drive rotor, the harmonic drive reciprocating ring comprising two or more ball transfer outer race housings that define ball transfer outer races;
at least one ball disposed within each of the ball track grooves and the ball transfer outer races;
wherein the ball track grooves form a recirculating path around the harmonic drive to convert harmonic, cycloidal or polynomial motion in the harmonic drive reciprocating ring to rotary motion; and
wherein the harmonic drive reciprocating ring is coupled to the helical drive reciprocating ring and the harmonic drive rotor so that reciprocating motion of the secondary reciprocating rotor assembly imparts linear motion to the helical and harmonic reciprocating rings so that the harmonic reciprocating ring rotates the helical drive screw to impart continuous rotary motion to the primary rotor assembly.

13. The rotary motor of claim 12, wherein the harmonic drive reciprocating ring is matched to torque capacity and displacement response of the rotary piston and helical drive assemblies.

14. The rotary motor of claim 12, wherein the helical drive reciprocating ring is coupled to the helical drive reciprocating rotor to provide rolling motion at contact points with the balls in conformance with planetary drive design principles.

15. The rotary motor of claim 12, wherein the helical drive reciprocating ring comprises ball transfers that couple the helical drive reciprocating ring to the helical drive screw.

16. The rotary motor of claim 12, wherein the helical drive reciprocating ring comprises two or more ball transfer outer race housings that define ball transfer outer races.

17. The rotary motor of claim 12, wherein the primary rotary assembly further comprises a reciprocating rotary piston assembly comprising two or more motor pistons.

18. The rotary motor of claim 12, wherein the harmonic drive reciprocating ring comprises ball transfers that couple the harmonic drive reciprocating ring to the harmonic drive rotor.

19. The rotary motor of claim 12, wherein the helical ring is rigidly coupled to the harmonic drive ring.

20. The rotary motor of claim 12, wherein the primary rotor assembly further comprises a primary rotor shaft comprising a fluid inlet and a fluid outlet for receiving and discharging the fluid.

21. The rotary motor of claim 12, further comprising a liner assembly disposed around the motor module for porting the fluid to and from the secondary reciprocating rotor assembly.

22. The rotary motor of claim 21, wherein the liner assembly comprises two or more stator ribs that with rotary pistons of the reciprocating rotary piston assembly partially define fluid chambers that receive fluid to drive the reciprocating rotary piston assembly.

23. A method for converting fluid energy to rotational energy, comprising:
provniding fluid to a motor module comprising a primary rotor assembly comprising a harmonic drive rotor;
diverting a portion of the fluid to energize a harmonic drive reciprocating ring to impart linear and reciprocative motion; and
transferring linear energy from the harmonic drive reciprocating ring via rolling motion to the harmonic drive rotor to convert harmonic, cycloidal or polynomial motion in the harmonic drive reciprocating ring to rotary motion of the harmonic drive rotor;
wherein the fluid is ported from the primary rotor assembly to energizing a reciprocating rotary piston assembly coupled to a helical drive reciprocating ring coupled to the harmonic drive reciprocating ring to transfer linear energy from the helical drive reciprocating ring to the harmonic drive reciprocating ring which then imparts rotary motion in the harmonic drive rotor thereby converting harmonic, cycloidal or polynomial motion in the harmonic drive reciprocating ring to rotary motion of the harmonic drive rotor.

24. The method of claim 23, wherein energy is transferred from the harmonic drive reciprocating ring to the harmonic drive rotor via the rolling motion of one or more balls disposed therebetween.

25. The method of claim 23, wherein the harmonic drive rotor is coupled to the primary rotor assembly and wherein the harmonic drive rotor imparts rotary motion to the primary rotor assembly.

26. The method of claim 23, wherein the fluid is ported to alternatingly pressured fluid chambers to apply alternating force to two pistons coupled to the harmonic drive reciprocating ring to impart the linear and reciprocative motion.

\* \* \* \* \*